US012633974B2

(12) United States Patent
Wang et al.

(10) Patent No.: US 12,633,974 B2
(45) Date of Patent: May 19, 2026

(54) INFORMATION INDICATION METHOD AND APPARATUS

(71) Applicant: HUAWEI TECHNOLOGIES CO., LTD., Shenzhen (CN)

(72) Inventors: Xiaohan Wang, Shanghai (CN); Huangping Jin, Shanghai (CN); Haicun Hang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 518 days.

(21) Appl. No.: 18/192,632

(22) Filed: Mar. 29, 2023

(65) Prior Publication Data

US 2023/0239014 A1 Jul. 27, 2023

Related U.S. Application Data

(63) Continuation of application No. PCT/CN2020/121648, filed on Oct. 16, 2020.

(51) Int. Cl.
| | |
|---|---|
| *H04L 5/00* | (2006.01) |
| *H04B 7/0456* | (2017.01) |
| *H04L 25/02* | (2006.01) |
| *H04W 72/232* | (2023.01) |

(52) U.S. Cl.
CPC ......... *H04B 7/0456* (2013.01); *H04L 5/0048* (2013.01); *H04L 25/0228* (2013.01); *H04W 72/232* (2023.01)

(58) Field of Classification Search
CPC ............. H04L 5/0048; H04L 25/0228; H04W 72/232; H04B 7/0456; H04B 7/0404
See application file for complete search history.

(56) References Cited

U.S. PATENT DOCUMENTS

| | | | | |
|---|---|---|---|---|
| 10,567,048 | B2 * | 2/2020 | Huang | H04B 7/0456 |
| 11,902,198 | B2 * | 2/2024 | Huang | H04B 7/0456 |
| 2018/0048366 | A1 * | 2/2018 | Sundararajan | H04B 7/0689 |
| 2018/0102827 | A1 * | 4/2018 | Noh | H04W 72/02 |
| 2018/0227101 | A1 * | 8/2018 | Park | H04L 5/0091 |
| 2019/0174527 | A1 | 6/2019 | Park et al. | |

FOREIGN PATENT DOCUMENTS

| | | |
|---|---|---|
| CN | 107733496 A | 2/2018 |
| CN | 108880644 A | 11/2018 |
| CN | 110868283 A | 3/2020 |
| WO | 2018202096 A1 | 11/2018 |

* cited by examiner

*Primary Examiner* — Lan-Huong Truong

(57) ABSTRACT

This disclosure discloses an information indication method and an apparatus, to resolve a problem that indication precision of an uplink precoding matrix is low. The method includes: receiving a downlink reference signal sent by a network device on a first transmission resource; performing channel estimation based on the downlink reference signal, to obtain a downlink equivalent channel corresponding to the first transmission resource; and determining, based on the downlink equivalent channel, to-be-indicated information corresponding to a terminal device, where the to-be-indicated information indicates an uplink precoding matrix used when a first terminal device sends uplink data on the first transmission resource. The downlink equivalent channel is obtained by performing channel estimation based on the downlink reference signal.

17 Claims, 10 Drawing Sheets

INFORMATION INDICATION METHOD AND APPARATUS

CROSS-REFERENCE TO RELATED APPLICATIONS

This disclosure is a continuation of International Application No. PCT/CN2020/121648, filed on Oct. 16, 2020, the disclosure of which is hereby incorporated by reference in its entirety.

TECHNICAL FIELD

This disclosure relates to the field of communication technologies, and in particular, to an information indication method and an apparatus.

BACKGROUND

A 5G communication system imposes higher requirements on a system capacity, spectral efficiency, and the like. In the 5G communication system, a massive multiple input multiple output (multiple input multiple output, MIMO) technology plays a critical role in the spectral efficiency of the system. When the MIMO technology is used, there are two uplink transmission manners: a codebook based uplink transmission (codebook based UL transmission) manner and a non-codebook based uplink transmission (non-codebook based UL transmission) manner.

In the codebook based uplink transmission manner, a base station determines an uplink precoding matrix based on a reference signal sent by a terminal device, and indicates, by using downlink control information (downlink control information, DCI), an index corresponding to the uplink precoding matrix in a codebook.

In the non-codebook based uplink transmission manner, the terminal device determines a plurality of candidate uplink precoding matrices based on a reference signal sent by the base station, and sends the plurality of candidate uplink precoding matrices to the base station. The base station selects a candidate uplink precoding matrix from the plurality of candidate uplink precoding matrices as an uplink precoding matrix, and indicates the uplink precoding matrix to the terminal device by using DCI.

However, regardless of the codebook based uplink transmission manner or the non-codebook based uplink transmission manner, precision of indicating the uplink precoding matrix by the base station is low.

SUMMARY

This disclosure provides an information indication method and an apparatus, to resolve a problem that indication precision of an uplink precoding matrix is low.

According to a first aspect, an embodiment of this disclosure provides an information obtaining method. The method may be applied to a terminal device, or a chip or a chip set/chip system in the terminal device. The method includes: receiving a downlink reference signal sent by a network device on a first transmission resource; performing channel estimation based on the downlink reference signal, to obtain a downlink equivalent channel corresponding to the first transmission resource; and determining, based on the downlink equivalent channel, to-be-indicated information corresponding to a terminal device, where the to-beindicated information indicates an uplink precoding matrix used when a first terminal device sends uplink data on the first transmission resource.

In this embodiment of this disclosure, the downlink equivalent channel is obtained by performing channel estimation based on the downlink reference signal. The downlink equivalent channel can be used to determine the uplink precoding matrix used when the terminal device sends the uplink data, so that the terminal device may obtain, based on the downlink equivalent channel, the uplink precoding matrix to be (directly or indirectly) indicated by the network device to the terminal device. In comparison with codebook based uplink transmission and non-codebook based uplink transmission, according to the method provided in this embodiment of this disclosure, it is unnecessary to occupy an additional resource to indicate the uplink precoding matrix, and there is no limitation on resource overheads. Therefore, the uplink precoding matrix can be indicated more precisely, and uplink transmission spectral efficiency can be improved.

In a possible design, the downlink reference signal is obtained by processing a downlink precoding matrix, and the downlink precoding matrix is determined based on a downlink channel response and the to-be-indicated information corresponding to the terminal device. In the foregoing design, the downlink precoding matrix of the downlink reference signal is determined based on the to-be-indicated information, so that the downlink equivalent channel obtained by performing channel estimation based on the downlink reference signal can be used to determine the to-be-indicated information corresponding to the terminal device. In this way, the terminal device may obtain, based on the downlink equivalent channel, content to be (directly or indirectly) indicated by the network device to the terminal device.

In a possible design, the determining, based on the downlink equivalent channel, to-be-indicated information corresponding to a terminal device includes: using the downlink equivalent channel on which normalization processing has been performed as the to-be-indicated information corresponding to the terminal device. According to the foregoing design, indication accuracy of the uplink precoding matrix can be improved.

In a possible design, the method further includes: receiving downlink control information DCI from the network device, where the DCI indicates N antenna ports on which the network device sends the downlink reference signal, and an uplink transmission rank, the DCI is associated with the N antenna ports, and N is an integer greater than 0. The performing channel estimation based on the downlink reference signal includes: performing channel estimation on the downlink reference signal that is from first n antenna ports of the N antenna ports and that is carried on the first transmission resource, where n is the uplink transmission rank. In the foregoing design, the DCI is associated with the N antenna ports, so that the DCI can trigger aperiodic sending of the downlink reference signal. In this way, the to-be-indicated information can be indicated to the terminal device by using the downlink precoding matrix.

In a possible design, the downlink reference signal sent on the N antenna ports is for determining the uplink precoding matrix.

In a possible design, the receiving a downlink reference signal sent by a network device on a first transmission resource includes: receiving, through M antennas, the downlink reference signal carried on the first transmission resource. The performing channel estimation based on the downlink reference signal includes: performing channel estimation on the downlink reference signal that is received through a first antenna of the M antennas and that is carried on the first transmission resource, where the first antenna is an antenna that is of the M antennas and that is for uplink sending. According to the foregoing design, a send port and a receive port of the terminal device can match each other. Therefore, the indication accuracy of the uplink precoding matrix can be improved.

In a possible design, before the receiving a downlink reference signal sent by a network device on a first transmission resource, an uplink reference signal is sent to the network device. According to the foregoing design, the network device can accurately obtain an uplink channel response, so that the indication accuracy of the uplink precoding matrix can be improved.

In a possible design, a frequency-domain granularity of the to-be-indicated information corresponding to the terminal device is related to a resource size of the first transmission resource. According to the foregoing design, the frequency-domain granularity of the to-be-indicated information is related to the resource size of the transmission resource on which the downlink reference signal is carried. Therefore, indication at different granularities may be implemented by adjusting the resource size of the first transmission resource. In this way, indication flexibility and precision can be improved.

In a possible design, the first transmission resource may include one sub-band, a plurality of sub-bands, one resource block (resource block, RB), a plurality of RBs, or the like.

According to a second aspect, an embodiment of this disclosure provides an information indication method. The method may be applied to a network device, or a chip or a chip set/chip system in the network device. The method includes: generating a downlink reference signal; and sending the downlink reference signal to a first terminal device on a first transmission resource, where the downlink reference signal is used by the first terminal device to determine to-be-indicated information corresponding to the first terminal device, and the to-be-indicated information indicates an uplink precoding matrix used when the first terminal device sends uplink data on the first transmission resource.

In this embodiment of this disclosure, a downlink equivalent channel is obtained by performing channel estimation based on the downlink reference signal. The downlink equivalent channel can be used to determine the uplink precoding matrix used when the terminal device sends the uplink data, so that the terminal device may obtain, based on the downlink equivalent channel, the uplink precoding matrix to be (directly or indirectly) indicated by the network device to the terminal device. In comparison with codebook based uplink transmission and non-codebook based uplink transmission, according to the method provided in this embodiment of this disclosure, it is unnecessary to occupy an additional resource to indicate the uplink precoding matrix, and there is no limitation on resource overheads. Therefore, the uplink precoding matrix can be indicated more precisely, and uplink transmission spectral efficiency can be improved.

In a possible design, the downlink reference signal is obtained by processing a downlink precoding matrix, and the downlink precoding matrix is determined based on a downlink channel response and the to-be-indicated information corresponding to the terminal device. In the foregoing design, the downlink precoding matrix of the downlink reference signal is determined based on the to-be-indicated information, so that the downlink equivalent channel can indicate the to-be-indicated information.

In a possible design, if a network device uses a same antenna port to send downlink reference signals to K terminal devices on the first transmission resource and the K terminal devices include the first terminal device, the downlink precoding matrix is determined based on a first matrix and a second matrix, where the first matrix includes downlink channel responses of the K terminal devices, and the second matrix includes to-be-indicated information respectively corresponding to the K terminal devices. According to the foregoing design, the network device may reuse a same antenna port to indicate, to a plurality of terminal devices, content of the plurality of terminal devices. In this way, resources can be saved.

In a possible design, downlink control information DCI is sent to the first terminal device, where the DCI indicates N antenna ports on which the network device sends the downlink reference signal, and an uplink transmission rank, the DCI is associated with the N antenna ports, and N is an integer greater than 0. The sending the downlink reference signal to a first terminal device on a first transmission resource includes: sending the downlink reference signal to the first terminal device on the first transmission resource through the N antenna ports. In the foregoing design, the DCI is associated with the N antenna ports, so that the DCI can trigger aperiodic sending of the downlink reference signal. In this way, the to-be-indicated information can be indicated to the terminal device by using the downlink precoding matrix.

In a possible design, the downlink reference signal sent on the N antenna ports is for determining the uplink precoding matrix.

In a possible design, before the generating a downlink reference signal, the method further includes: receiving uplink reference signals sent by a plurality of terminal devices including the first terminal device; and determining, based on the uplink reference signals sent by the plurality of terminal devices, the to-be-indicated information corresponding to the first terminal device. In the foregoing design, the network device may determine the uplink precoding matrix of the first terminal device with reference to uplink channels of the plurality of terminal devices, so that communication quality of the terminal device in a multi-user scenario can be improved.

In a possible design, a frequency-domain granularity of the to-be-indicated information corresponding to the terminal device is related to a resource size of the first transmission resource. According to the foregoing design, the frequency-domain granularity of the to-be-indicated information is related to the resource size of the transmission resource on which the downlink reference signal is carried. Therefore, indication at different granularities may be implemented by adjusting the resource size of the first transmission resource. In this way, indication flexibility and precision can be improved.

In a possible design, the first transmission resource may include one sub-band, a plurality of sub-bands, one RB, a plurality of RBs, or the like.

According to a third aspect, an embodiment of this disclosure provides an information obtaining method. The method may be applied to a terminal device, or a chip or a chip set/chip system in the terminal device. The method includes: receiving downlink reference signals respectively sent by a network device on at least two transmission resources; separately performing channel estimation based on the reference signal carried on each of the at least two transmission resources, to obtain downlink equivalent channels respectively corresponding to the at least two transmission resources; and determining, based on a ratio of power of the downlink equivalent channels respectively corresponding to the at least two transmission resources, power allocated for sending uplink data on the at least two transmission resources.

In the manner provided in this embodiment of this disclosure, power allocated between transmission resources may be indicated. For example, assuming that one transmission resource includes one sub-band in frequency domain, power allocated between sub-bands may be indicated in the foregoing manner. In this way, the terminal device may determine, based on a ratio of power at which downlink equivalent channels are received on the sub-bands, the power allocated between the sub-bands.

In a possible design, the downlink reference signal carried on each of the transmission resources is obtained by processing a downlink precoding matrix corresponding to each of the transmission resources; and the downlink precoding matrices corresponding to the at least two transmission resources are determined based on downlink channel responses respectively corresponding to the at least two transmission resources and a ratio of power of the at least two transmission resources, where the downlink channel responses corresponding to the transmission resources are channel responses for receiving the downlink signals by a terminal device on the transmission resources, and the ratio of the power is a ratio of transmit power at which the terminal device separately respectively sends uplink signals on the at least two transmission resources. In the foregoing design, a ratio of power of a plurality of transmission resources is determined based on to-be-indicated information, so that the downlink equivalent channels may indicate the ratio of the power of the plurality of transmission resources.

In a possible design, the determining, based on a ratio of power of the downlink equivalent channels respectively corresponding to the at least two transmission resources, power allocated for sending uplink data on the at least two transmission resources includes: determine that transmit power at which the uplink data is sent on a first transmission resource satisfies the following formula, where the first transmission resource is any resource in the at least two transmission resources:

$$\frac{p}{P} = \frac{\|P_{UL}^n\|^2}{\sum_i^K \|P_{UL}^n\|^2},$$

where
    p is the transmit power at which the uplink data is sent on the first transmission resource, P is total power of an uplink transmission layer of the terminal device, $$P_{UL}^n$$

is a downlink equivalent channel corresponding to the first transmission resource, K is a quantity of transmission resources included in the at least two transmission resources, and $$P_{UL}^k$$

is a downlink equivalent channel corresponding to a $k^{th}$ transmission resource in the at least two transmission resources. According to the foregoing design, the terminal device may determine the transmit power of each transmission resource based on the total power of the uplink transmission layer.

In a possible design, assuming that one transmission resource includes one sub-band in frequency domain, the terminal device may determine, based on a ratio of power at which downlink equivalent channels are received on sub-bands, power allocated between the sub-bands. The power allocated between the sub-bands may be indicated in the foregoing manner.

In a possible design, assuming that one transmission resource includes one RB in frequency domain, the terminal device may determine, based on a ratio of power at which downlink equivalent channels are received on RBs, power allocated between the RBs. Therefore, the power allocated between the RBs may be indicated in the foregoing manner.

According to a fourth aspect, an embodiment of this disclosure provides an information indication method. The method may be applied to a network device, or a chip or a chip set/chip system in the network device. The method includes: generating downlink reference signals respectively corresponding to at least two transmission resources; and respectively sending the corresponding downlink reference signals to a terminal device on the at least two transmission resources, where the downlink reference signals carried on the at least two transmission resources are used by the terminal device to determine power allocated for sending uplink data by the terminal device on the at least two transmission resources.

In a possible design, the downlink reference signal corresponding to each of the transmission resources is obtained by processing a downlink precoding matrix corresponding to each of the transmission resources; and the downlink precoding matrices corresponding to the at least two transmission resources are determined based on downlink channel responses respectively corresponding to the at least two transmission resources and a ratio of power of the at least two transmission resources, where the downlink channel responses corresponding to the transmission resources are channel responses for receiving the downlink signals by the terminal device on the transmission resources; and the ratio of the power is a ratio of transmit power at which the terminal device respectively sends uplink signals on the at least two transmission resources. In the foregoing design, a ratio of power of a plurality of transmission resources is determined based on to-be-indicated information, so that downlink equivalent channels may indicate the ratio of the power of the plurality of transmission resources.

In a possible design, assuming that one transmission resource includes one sub-band in frequency domain, power allocated between sub-bands may be indicated in the foregoing manner. In this way, the terminal device may determine, based on a ratio of power at which downlink equivalent channels are received on the sub-bands, the power allocated between the sub-bands.

In a possible design, assuming that one transmission resource includes one RB in frequency domain, power allocated between RBs may be indicated in the foregoing manner. In this way, the terminal device may determine, based on a ratio of power at which the downlink equivalent channels are received on the RBs, the power allocated between the RBs.

According to a fifth aspect, an embodiment of this disclosure provides an information obtaining method. The method may be applied to a terminal device, or a chip or a chip set/chip system in the terminal device. The method includes: receiving a downlink reference signal sent by a network device on a first transmission resource; performing channel estimation based on the downlink reference signal, to obtain a downlink equivalent channel corresponding to the first transmission resource; and determining, based on the downlink equivalent channel, to-be-indicated information corresponding to a terminal device, where the to-be-indicated information is content that the network device intends to indicate to the terminal device.

In this embodiment of this disclosure, the downlink equivalent channel is obtained by performing channel estimation based on the downlink reference signal. The downlink equivalent channel can be used to determine the to-be-indicated information corresponding to the terminal device, so that the terminal device may obtain, based on the downlink equivalent channel, the content to be (directly or indirectly) indicated by the network device to the terminal device.

In a possible design, the to-be-indicated information indicates an uplink precoding matrix used when a first terminal device sends uplink data on the first transmission resource. In the foregoing design, the downlink equivalent channel is obtained by performing channel estimation based on the downlink reference signal. The downlink equivalent channel can be used to determine the uplink precoding matrix used when the terminal device sends the uplink data, so that the terminal device may obtain, based on the downlink equivalent channel, the uplink precoding matrix to be (directly or indirectly) indicated by the network device to the terminal device.

In a possible design, the to-be-indicated information indicates a weight of a receiver of the terminal device. In the foregoing design, the downlink equivalent channel is obtained by performing channel estimation based on the downlink reference signal. The downlink equivalent channel can be used to determine the weight of the receiver of the terminal device, so that the terminal device may obtain, based on the downlink equivalent channel, the weight of the receiver to be (directly or indirectly) indicated by the network device to the terminal device.

In a possible design, the to-be-indicated information indicates uplink transmit power. In the foregoing design, the downlink equivalent channel is obtained by performing channel estimation based on the downlink reference signal. The downlink equivalent channel can be used to determine the uplink transmit power, so that the terminal device may obtain, based on the downlink equivalent channel, the uplink transmit power to be (directly or indirectly) indicated by the network device to the terminal device.

According to a sixth aspect, an embodiment of this disclosure provides an information indication method. The method may be applied to a network device, or a chip or a chip set/chip system in the network device. The method includes: generating a downlink reference signal; and sending the downlink reference signal to a first terminal device on a first transmission resource, where the downlink reference signal is used by the first terminal device to determine to-be-indicated information corresponding to the first terminal device, and the to-be-indicated information is content that a network device intends to indicate to the terminal device.

In this embodiment of this disclosure, a downlink equivalent channel is obtained by performing channel estimation based on the downlink reference signal. The downlink equivalent channel can be used to determine the to-beindicated information corresponding to the terminal device, so that the terminal device may obtain, based on the downlink equivalent channel, the content to be (directly or indirectly) indicated by the network device to the terminal device.

In a possible design, the to-be-indicated information indicates an uplink precoding matrix used when the first terminal device sends uplink data on the first transmission resource. In the foregoing design, the downlink equivalent channel is obtained by performing channel estimation based on the downlink reference signal. The downlink equivalent channel can be used to determine the uplink precoding matrix used when the terminal device sends the uplink data, so that the terminal device may obtain, based on the downlink equivalent channel, the uplink precoding matrix to be (directly or indirectly) indicated by the network device to the terminal device.

In a possible design, the to-be-indicated information indicates a weight of a receiver of the terminal device. In the foregoing design, the downlink equivalent channel is obtained by performing channel estimation based on the downlink reference signal. The downlink equivalent channel can be used to determine the weight of the receiver of the terminal device, so that the terminal device may obtain, based on the downlink equivalent channel, the weight of the receiver to be (directly or indirectly) indicated by the network device to the terminal device.

In a possible design, the to-be-indicated information indicates uplink transmit power. In the foregoing design, the downlink equivalent channel is obtained by performing channel estimation based on the downlink reference signal. The downlink equivalent channel can be used to determine the uplink transmit power, so that the terminal device may obtain, based on the downlink equivalent channel, the uplink transmit power to be (directly or indirectly) indicated by the network device to the terminal device.

According to a seventh aspect, this disclosure provides an information obtaining apparatus. The apparatus may be a terminal device, or may be a chip or a chip set/chip system in the terminal device. The apparatus may include a processing module and a transceiver module. When the apparatus is the terminal device, the processing module may be a processor, and the transceiver module may be a transceiver. The apparatus may further include a storage module, and the storage module may be a memory. The storage module is configured to store instructions, and the processing module executes the instructions stored in the storage module, to perform a corresponding function in the first aspect, the third aspect, or the fifth aspect. When the apparatus is the chip or the chip set/chip system in the terminal device, the processing module may be a processor, a processing circuit, a logic circuit, or the like. The transceiver module may be an input/output interface, a pin, a circuit, or the like. The processing module executes instructions stored in a storage module, to perform a corresponding function in the first aspect, third aspect, or the fifth aspect. The storage module may be a storage module (for example, a register or a cache) in the chip or the chip set/chip system, or may be a storage module (for example, a read-only memory or a random-access memory) that is outside the chip or the chip set/chip system and that is inside a base station.

According to an eighth aspect, this disclosure provides an information indication apparatus. The apparatus may be a network device, or may be a chip or a chip set/chip system in the network device. The apparatus may include a processing module and a transceiver module. When the apparatus is the network device, the processing module may be a processor, and the transceiver module may be a transceiver. The apparatus may further include a storage module, and the storage module may be a memory. The storage module is configured to store instructions, and the processing module executes the instructions stored in the storage module, to perform a corresponding function in the second aspect, the fourth aspect, or the sixth aspect. When the apparatus is the chip or the chip set/chip system in the network device, the processing module may be a processor, a processing circuit, a logic circuit, or the like. The transceiver module may be an input/output interface, a pin, a circuit, or the like. The processing module executes instructions stored in a storage module, to perform a corresponding function in the second aspect, fourth aspect, or the sixth aspect. The storage module may be a storage module (for example, a register or a cache) in the chip or the chip set/chip system, or may be a storage module (for example, a read-only memory or a random-access memory) that is outside the chip or the chip set/chip system and that is inside a base station.

According to a ninth aspect, a channel obtaining apparatus is provided, including at least one processor. Optionally, the apparatus may further include a communication interface. Optionally, the apparatus may further include a memory. The communication interface is configured to send information, and/or a message, and/or data between the apparatus and another apparatus. The memory is configured to store computer-executable instructions. When the apparatus runs, the processor executes the computer-executable instructions stored in the memory, to enable the apparatus to perform the method according to the first aspect or any design of the first aspect, the third aspect or any design of the third aspect, or the fifth aspect or any design of the fifth aspect. The apparatus may be a chip or a chip set/chip system in a terminal device. The processor may be a processing circuit, a logic circuit, or the like, and communication interface may be an input and/or an output pin, a circuit, or the like.

According to a tenth aspect, a communication apparatus is provided, including at least one processor. Optionally, the apparatus may further include a communication interface. Optionally, the apparatus may further include a memory. The communication interface is configured to send information, and/or a message, and/or data between the apparatus and another apparatus. The memory is configured to store computer-executable instructions. When the apparatus runs, the processor executes the computer-executable instructions stored in the memory, to enable the apparatus to perform the method according to the second aspect or any design of the second aspect, or the fourth aspect or any design of the fourth aspect, or the sixth aspect or any design of the sixth aspect. The apparatus may be a chip or a chip set/chip system in a network device. The processor may be a processing circuit, a logic circuit, or the like, and the communication interface may be an input and/or an output pin, a circuit, or the like.

According to an eleventh aspect, an embodiment of this disclosure provides a computer storage medium. The computer storage medium stores program instructions, and when the program instructions are run on a communication device, the communication device is enabled to perform the method according to any one of the first aspect to the sixth aspect and any possible design of any one of the first aspect to the sixth aspect in embodiments of this disclosure.

According to a twelfth aspect, an embodiment of this disclosure provides a computer program product. When the computer program product runs on a communication device, the communication device is enabled to perform the method according to any one of the first aspect to the sixth aspect and any possible design of any one of the first aspect to the sixth aspect in embodiments of this disclosure.

According to a thirteenth aspect, an embodiment of this disclosure provides a chip. The chip is coupled to a memory, to perform the method according to the first aspect and any possible design of the first aspect, or the method according to the third aspect or any design of the third aspect, or the fifth aspect or any design of the fifth aspect in embodiments of this disclosure.

According to a fourteenth aspect, an embodiment of this disclosure provides a chip. The chip is coupled to a memory, to perform the method according to the second aspect and any possible design of the second aspect, or the fourth aspect or any design of the fourth aspect, or the sixth aspect or any design of the sixth aspect in embodiments of this disclosure.

According to a fifteenth aspect, an embodiment of this disclosure provides a chip, including a communication interface and at least one processor. The processor runs to perform the method according to the first aspect and any possible design of the first aspect, or the method according to the third aspect or any design of the third aspect, or the fifth aspect or any design of the fifth aspect in embodiments of this disclosure.

According to a sixteenth aspect, an embodiment of this disclosure provides a chip, including a communication interface and at least one processor. The processor runs to perform the method according to the second aspect and any possible design of the second aspect, or the fourth aspect or any design of the fourth aspect, or the sixth aspect or any design of the sixth aspect in embodiments of this disclosure.

It should be noted that "coupling" in embodiments of this disclosure indicates a direct combination or an indirect combination of two components.

DESCRIPTION OF EMBODIMENTS

The following describes in detail embodiments of this disclosure with reference to the accompanying drawings.

Technical solutions provided in this disclosure may be applied to various communication systems, for example, an internet of things (internet of things, IoT), a narrow band internet of things (narrow band internet of things, NB-IoT), long term evolution (long term evolution, LTE), a 5th generation (5G) communication system, an LTE and 5G hybrid architecture, a 5th generation (5th generation, 5G) new radio (new radio, NR) system, and a new communication system emerging in future communication development. The 5G communication system described in this disclosure may include at least one of a non-standalone (non-standalone, NSA) 5G communication system and a standalone (standalone, SA) 5G communication system. Alternatively, the communication system may be a public land mobile network (public land mobile network, PLMN) network, a device-to-device (device-to-device, D2D) network, a machine to machine (machine to machine, M2M) network, or another network.

Figure 1:
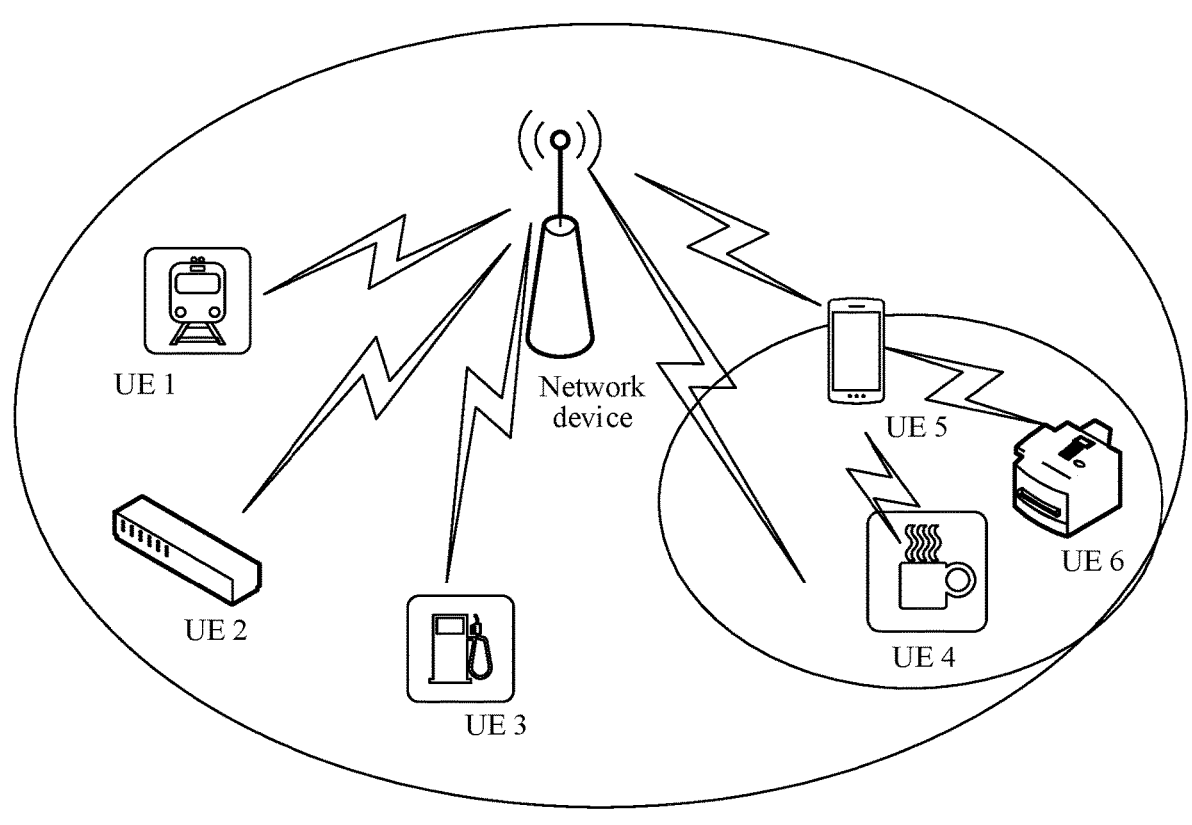
FIG. 1 is a schematic diagram of an architecture of a communication system according to an embodiment of this disclosure.

FIG. 1 shows a communication system according to an embodiment of this disclosure. The communication system includes a network device and six terminal devices, for example, UE 1 to UE 6. In the communication system, the UE 1 to the UE 6 may send signals to the network device on an uplink, and the network device may receive the uplink signals sent by the UE 1 to the UE 6. In addition, a communication subsystem may alternatively include the UE 4 to the UE 6. The network device may send downlink signals to the UE 1, the UE 2, the UE 3, and the UE 5 on a downlink. The UE 5 may send signals to the UE 4 and the UE 6 on an inter-terminal link (sidelink, SL) based on a D2D technology. FIG. 1 is merely a schematic diagram, and a type of the communication system, a quantity of devices included in the communication system, a type of the device included in the communication system, and the like are not specifically limited in this disclosure.

The terminal device in embodiments of this disclosure is an entity that is on a user side and that is configured to receive or send a signal. The terminal device may be a device providing voice and data connectivity for a user, for example, a handheld device or a vehicle-mounted device having a wireless connection function. The terminal device may alternatively be another processing device connected to a wireless modem. The terminal device may communicate with one or more core networks through a radio access network (radio access network, RAN). The terminal device may alternatively be referred to as a wireless terminal, a subscriber unit (subscriber unit), a subscriber station (subscriber station), a mobile station (mobile station), a mobile (mobile), a remote station (remote station), an access point (access point), a remote terminal (remote terminal), an access terminal (access terminal), a user terminal (user terminal), a user agent (user agent), a user device (user device), user equipment (user equipment), or the like. The terminal device may be a mobile terminal, for example, a mobile phone (or referred to as a "cellular" phone), or a computer that has a mobile terminal. For example, the terminal device may be a portable, pocket-sized, handheld, computer built-in, or vehicle-mounted mobile apparatus, which exchanges voice and/or data with the radio access network. For example, the terminal device may alternatively be a device such as a personal communications service (personal communications service, PCS) phone, a cordless phone, a session initiation protocol (session initiation protocol, SIP) phone, a wireless local loop (wireless local loop, WLL) station, or a personal digital assistant (personal digital assistant, PDA). Common terminal devices include, for example, a mobile phone, a tablet, a notebook computer, a palmtop computer, a mobile internet device (mobile internet device, MID), and a wearable device such as a smart watch, a smart band, or a pedometer. However, this is not limited in embodiments of this disclosure. Alternatively, the terminal device in embodiments of this disclosure may be a terminal device or the like that appears in a future evolved PLMN. This is not limited in embodiments of this disclosure.

In addition, the terminal device in embodiments of this disclosure may alternatively be a terminal device in an IoT system. IoT is an important part of future development of information technologies. A main technical feature of the IoT is connecting a thing to a network by using a communication technology, to implement an intelligent network of human-machine interconnection and thing-to-thing interconnection. In embodiments of this disclosure, an IoT technology may implement massive connections, deep coverage, and terminal power saving by using, for example, a narrow band (narrow band, NB) technology.

In addition, in embodiments of this disclosure, the terminal device may further include a sensor such as an intelligent printer, a train detector, or a gas station. Main functions of the terminal device include collecting data (for some terminal devices), receiving control information and downlink data from a network device, sending an electromagnetic wave, and transmitting uplink data to the network device.

The network device in embodiments of this disclosure is an entity that is on a network side and that is configured to send or receive a signal. The network device in embodiments of this disclosure may be a device in a wireless network, for example, a RAN node that enables the terminal to access the wireless network. For example, the network device may be an evolved NodeB (evolved NodeB, eNB or e-NodeB) in LTE, a new radio controller (new radio controller, NR controller), a gNodeB (gNB) in a 5G system, a central unit (central unit, CU), a new radio base station, a remote radio module, a micro base station, a relay (relay), a distributed unit (distributed unit, DU), a home base station, a transmission reception point (transmission reception point, TRP), a transmission point (transmission point, TP), or any other wireless access device. This is not limited in embodiments of this disclosure. The network device may cover one or more cells.

Figure 2:
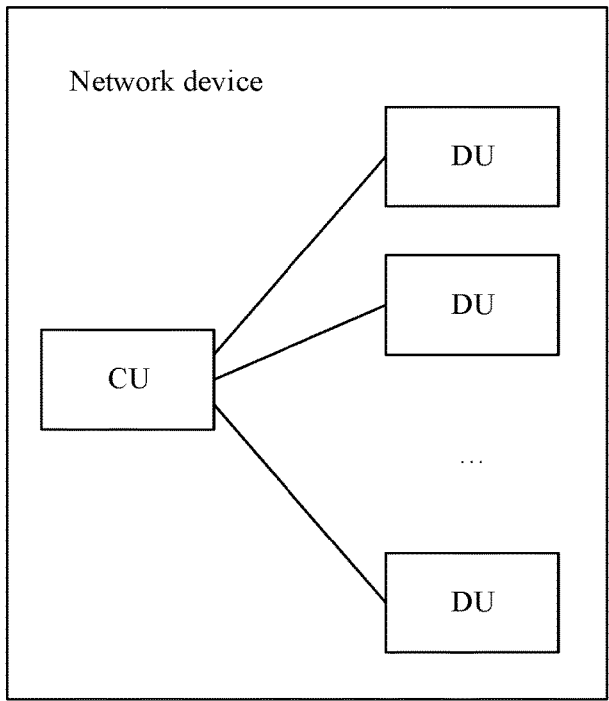
FIG. 2 is a schematic diagram of a structure of a network device according to an embodiment of this disclosure.

For example, a structure of the network device in embodiments of this disclosure may be as shown in FIG. 2. Specifically, a radio access network device may be divided into a CU and at least one DU. The CU may be configured to manage or control the at least one DU. In other words, the CU is connected to the at least one DU. In this structure, protocol layers of the radio access network device in the communication system may be split. Some protocol layers are controlled by the CU in a centralized manner, and functions of some or all of remaining protocol layers are distributed in the DU. The CU controls the DU in a centralized manner. That the radio access network device is a gNB is used as an example. Protocol layers of the gNB include a radio resource control (radio resource control, RRC) layer, a service data adaptation protocol (service data adaptation protocol, SDAP) layer, a packet data convergence protocol (packet data convergence protocol, PDCP) layer, a radio link control (radio link control, RLC) layer, a media access control (media access control, MAC) layer, and a physical layer. For example, the CU may be configured to implement functions of the RRC layer, the SDAP layer, and the PDCP layer, and the DU may be configured to implement functions of the RLC layer, the MAC layer, and the physical layer. Protocol stacks included in the CU and the DU are not specifically limited in embodiments of this disclosure.

Figure 3:
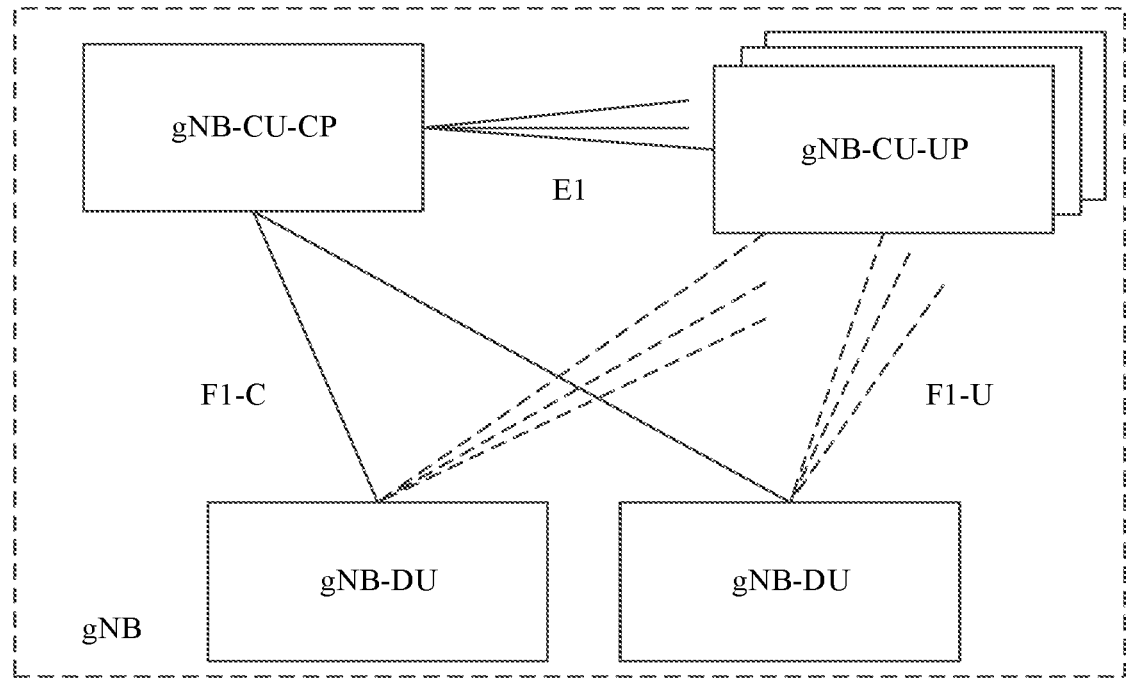
FIG. 3 is a schematic diagram of a structure of a gNB according to an embodiment of this disclosure.

For example, the CU in embodiments of this disclosure may be further divided into one control plane (CU-control plane, CU-CP) network element and a plurality of user plane (CU-user plane, CU-UP) network elements. The CU-CP may be used for control plane management, and the CU-UP may be used for user plane data transmission. An interface between the CU-CP and the CU-UP may be an E1 interface. An interface between the CU-CP and the DU may be F1-C, and is used for control plane signaling transmission. An interface between the CU-UP and the DU may be F1-U, and is used for user plane data transmission. The CU-UP and the CU-UP may be connected through an Xn-U interface, to perform user plane data transmission. For example, a gNB is used as an example. A structure of the gNB may be as shown in FIG. 3.

Figure 4:
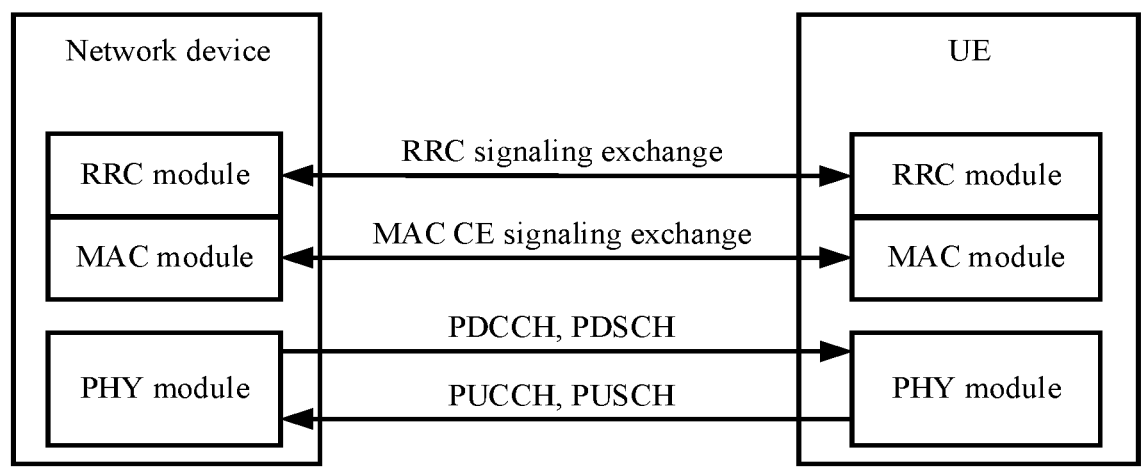
FIG. 4 is a schematic diagram of communication between a network device and UE according to an embodiment of this disclosure.

For example, communication between a network device and UE may be as shown in FIG. 4. The network device and the UE may exchange RRC signaling by using RRC modules. The network device and the UE may exchange media access control control element (media access control control element, MAC CE) signaling by using MAC modules. The network device and the UE may exchange, by using PHY modules, uplink/downlink control signaling such as a physical uplink control channel (physical uplink control channel, PUCCH)/physical downlink control channel (physical downlink control channel, PDCCH), uplink/downlink data signaling such as a physical uplink shared channel (physical uplink shared channel, PUSCH)/physical downlink shared channel (physical downlink shared channel, PDSCH), and the like.

The network architecture and the service scenario described in embodiments of this disclosure are intended to describe the technical solutions in embodiments of this disclosure more clearly, and do not constitute a limitation on the technical solutions provided in embodiments of this disclosure. A person of ordinary skill in the art may learn that with the evolution of the network architecture and the emergence of new service scenarios, the technical solutions provided in embodiments of this disclosure are also applicable to similar technical problems.

The 5G communication system imposes higher requirements on a system capacity, spectral efficiency, and the like. Uplink capacity improvement is a key challenge for the 5G communication system. Currently, there are two uplink transmission manners: a codebook based uplink transmission (Codebook based UL transmission) manner and a non-codebook based uplink transmission (Non-codebook based UL transmission) manner.

Figure 5:
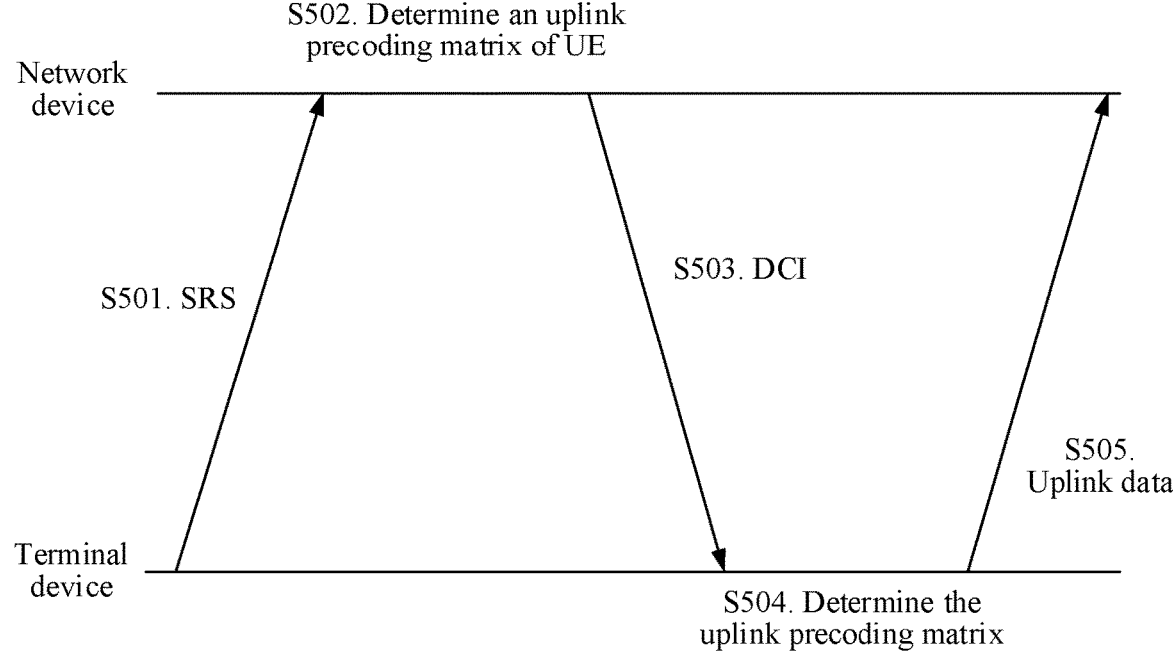
FIG. 5 is a schematic flowchart of codebook based uplink transmission according to an embodiment of this disclosure.

As shown in FIG. 5, a transmission process of codebook based UL transmission is as follows:

S501. A terminal device sends a sounding reference signal (sounding reference signal, SRS) to a network device.

S502. The network device estimates an uplink channel based on the SRS, and determines an uplink precoding matrix of UE.

S503. The network device sends downlink control information (downlink control information, DCI) to the terminal device, where the DCI indicates an index corresponding to the uplink precoding matrix in a codebook.

S504. The terminal device determines the uplink precoding matrix based on the DCI.

S505. The terminal device sends uplink data based on the uplink precoding matrix.

In the codebook based UL transmission manner, the network device indicates the uplink precoding matrix by using the DCI. However, because overheads for indicating a precoding matrix indicator (precoding matrix indicator, PMI) in the DCI are low, and the codebook is for performing indication based on bandwidth, an indication precision of the uplink precoding matrix is low.

Figure 6:
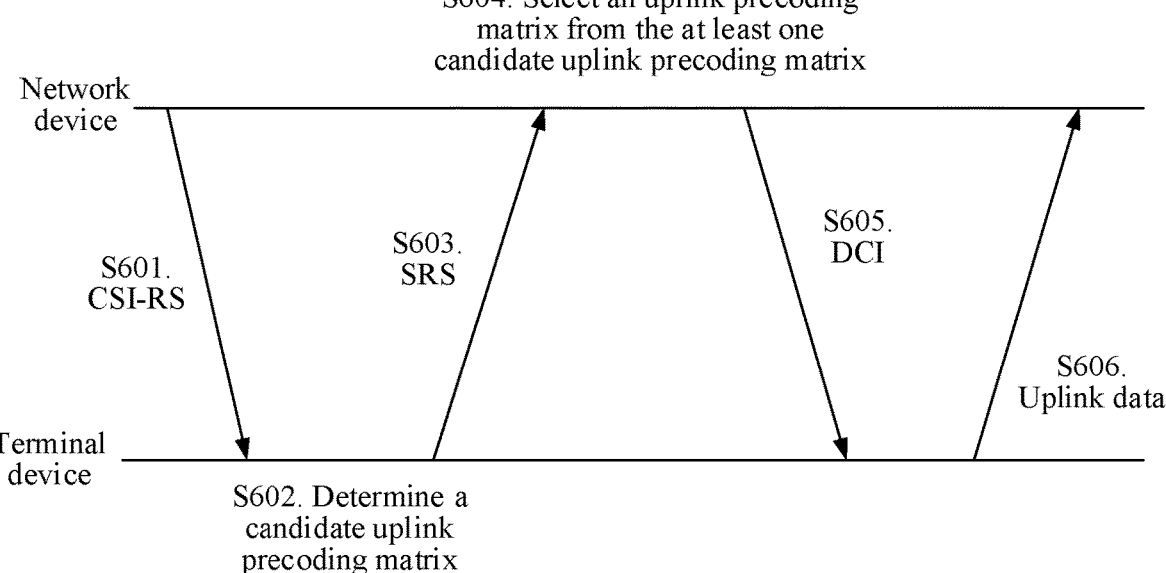
FIG. 6 is a schematic flowchart of non-codebook based uplink transmission according to an embodiment of this disclosure.

As shown in FIG. 6, a transmission process of non-codebook based UL transmission is as follows:

S601. A network device sends a channel state information reference signal (channel state information reference signal, CSI-RS) to a terminal device.

S602. The terminal device estimates a downlink channel based on the CSI-RS, and determines at least one candidate uplink precoding matrix.

S603. The terminal device sends an SRS to the network device, where the SRS carries the at least one candidate uplink precoding matrix.

S604. The network device selects an uplink precoding matrix from the at least one candidate uplink precoding matrix.

S605. The network device sends DCI to the terminal device, where the DCI carries the uplink precoding matrix.

S606. The terminal device sends uplink data based on the uplink precoding matrix.

In the non-codebook based UL transmission manner, when the terminal device determines the candidate uplink precoding matrix based on the CSI-RS, the candidate uplink precoding matrix is mainly determined based on single user (single user, SU) transmission. When uplink multi-user (multi-user, MU) transmission is performed, accuracy of the candidate uplink precoding matrix determined by the terminal device is low. In addition, the DCI is for performing indication based on a wideband, and a frequency granularity for the indication is large. As a result, precision is low.

Based on this, embodiments of this disclosure provide an information obtaining method and an apparatus, to resolve a problem that indication precision of an uplink precoding matrix is low. The method and the apparatus are based on a same inventive concept. Because the method and the apparatus have similar problem-resolving principles, mutual reference may be made between implementation of the apparatus and implementation of the method. Repeated content is not described herein again.

In the descriptions of this disclosure, unless otherwise specified, "/" means "or". For example, A/B may represent A or B. The term "and/or" in this specification describes only an association relationship for describing associated objects and represents that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this disclosure, terms such as "example" or "for example" are used to represent giving an example, an illustration, or a description. Any embodiment or design solution described as an "example" or "for example" in this disclosure should not be explained as being more preferred or having more advantages than another embodiment or design solution. Exactly, use of the terms such as "example" or "for example" are intended to present a relative concept in a specific manner.

In embodiments of this disclosure, "being for indicating" may include being for directly indicating and being for indirectly indicating. For example, that when a piece of indication information is described as being for indicating information I, the indication information may directly indicate I or indirectly indicate I, but it does not necessarily indicate that the indication information carries I.

Information indicated by indication information is referred to as to-be-indicated information. In a specific implementation process, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of the plurality of pieces of information may further be identified and indicated in a unified manner, to reduce indication overheads caused by separately indicating same information.

Furthermore, specific indication manners may alternatively be various existing indication manners, for example, but not limited to, the foregoing indication manners and various combinations thereof. For details of the various indication manners, refer to a conventional technology. Details are not described in this specification. It can be learned from the foregoing descriptions that, for example, when a plurality of pieces of information of a same type need to be indicated, there may be a case in which different information may be indicated in different manners. In a specific implementation process, a required indication manner may be selected based on a specific requirement. The selected indication manner is not limited in embodiments of this disclosure. In this way, the indication manners in embodiments of this disclosure should be understood as covering various methods that can enable a to-be-indicated party to learn of the to-be-indicated information.

The following describes in detail the information obtaining methods provided in this disclosure with reference to the accompanying drawings.

Figure 7:
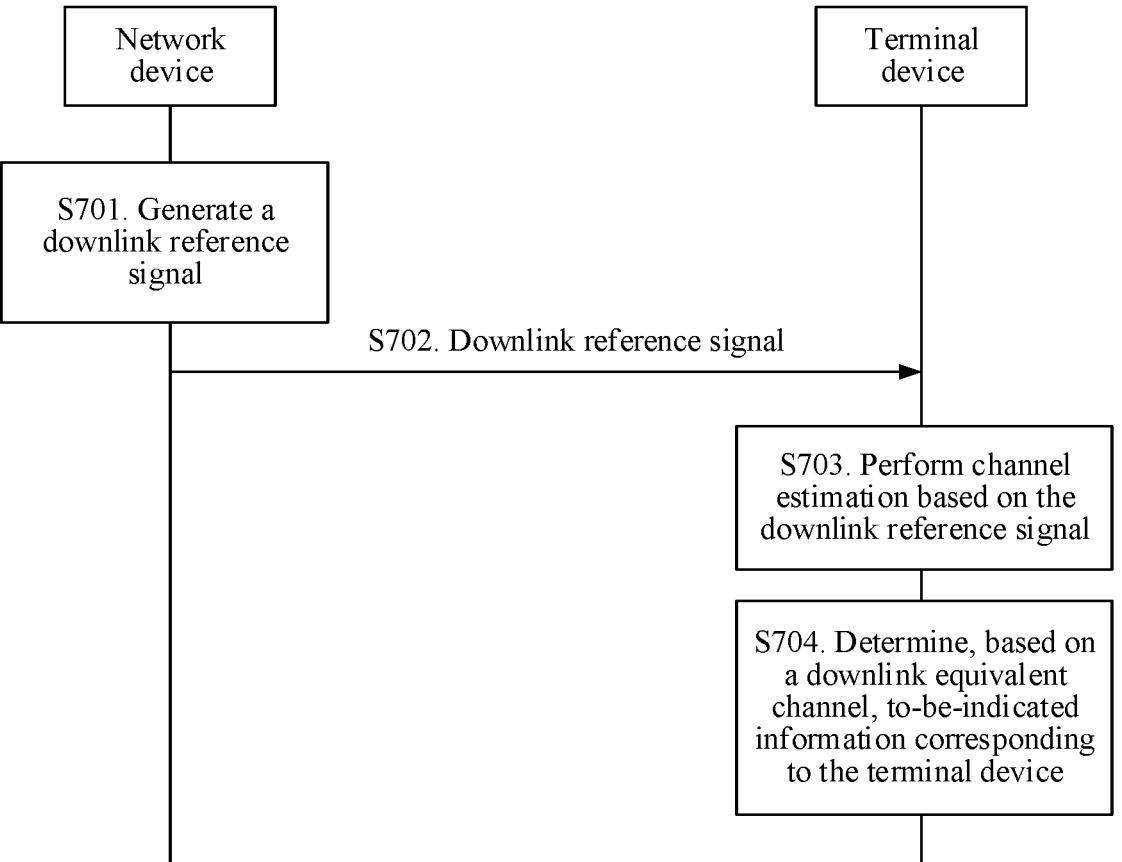
FIG. 7 is a schematic flowchart of an information indication method according to an embodiment of this disclosure.

FIG. 7 shows an information obtaining method according to an embodiment of this disclosure. The method may be applied to the communication system shown in FIG. 1. For ease of understanding, this embodiment is described from perspectives of a terminal device side and a network device side. It should be understood that this does not constitute a limitation on this disclosure. In this disclosure, there are improvements on either of the terminal device side and the network device side. Specifically, the method may be applied to a terminal device and a network device, or may be applied to chips or chip sets/chip systems in the terminal device and the network device. The following uses an example in which the method is applied to the terminal device and the network device for description. The information obtaining method may specifically include the following steps.

S701. A network device generates a downlink reference signal, where the downlink reference signal is used by a first terminal device to determine to-be-indicated information corresponding to the first terminal device.

Optionally, the downlink reference signal may be obtained by processing a downlink precoding matrix, and the downlink precoding matrix is determined based on a downlink channel response and the to-be-indicated information corresponding to the terminal device. This disclosure is not limited thereto. The downlink reference signal may alternatively be obtained by performing processing on other information, for example, a variation of the to-be-indicated information corresponding to the terminal device or processed information, provided that the terminal device can finally determine, based on the downlink reference signal, the to-be-indicated information corresponding to the terminal device.

For example, the to-be-indicated information may indicate information that the network device intends to indicate to the terminal device. For example, the to-be-indicated information may indicate an uplink precoding matrix used when the first terminal device sends uplink data on a first transmission resource. Alternatively, the to-be-indicated information may indicate a weight of a receiver of the terminal device, uplink transmit power, or the like. It should be understood that, provided that there is information that the network device needs to indicate to the terminal device, the indication may be performed according to the method provided embodiments of this disclosure.

In an implementation, the to-be-indicated information may directly indicate the information that the network device intends to indicate to the terminal device. For example, the to-be-indicated information is information that the network device intends to indicate to the terminal device.

In another implementation, the to-be-indicated information may indirectly indicate the information that the network device intends to indicate to the terminal device. For example, the to-be-indicated information may indicate, with reference to other information, the information that the network device intends to indicate to the terminal device. The other information may be obtained by the first terminal device in another manner, may be preset, may be specified in a protocol, or the like.

S702. The network device sends the downlink reference signal to the first terminal device on the first transmission resource. Correspondingly, the first terminal device receives the downlink reference signal sent by the network device on the first transmission resource.

For example, a granularity of the first transmission resource may be: One sub-band is included in frequency domain, or a plurality of sub-bands are included in frequency domain. Alternatively, the granularity of the first transmission resource may be one RB, or may be a plurality of RBs. Alternatively, the first transmission resource may be at another granularity. This is not listed one by one herein.

It may be understood that, to send the downlink reference signal on the first transmission resource, the downlink reference signal may be carried on a part of the first transmission resource for sending. For example, assuming that the granularity of the first transmission resource is one RB, the network device may send the downlink reference signal on one RE of the RB.

In an example description, assuming that the to-be-indicated information is an uplink precoding matrix, the network device may send the downlink reference signal on one RE of one RB, to indicate the uplink precoding matrix for performing uplink transmission by the terminal device on the RB.

S703. The first terminal device performs channel estimation based on the downlink reference signal, to obtain a downlink equivalent channel corresponding to the first transmission resource.

S704. The first terminal device determines, based on the downlink equivalent channel, the to-be-indicated information corresponding to the terminal device.

In an implementation, the first terminal device may determine the to-be-indicated information based on the downlink equivalent channel. For example, the first terminal device may use the downlink equivalent channel as the to-be-indicated information. For another example, the first terminal device may use the downlink equivalent channel on which processing (for example, normalization processing) has been performed as the to-be-indicated information.

In another implementation, the first terminal device may alternatively determine the to-be-indicated information based on the downlink equivalent channel and other information. The other information may be obtained by the first terminal device in another manner, may be preset, may be specified in a protocol, or the like.

In still another implementation, the first terminal device may alternatively determine the to-be-indicated information based on a part of the downlink equivalent channel. For example, the first terminal device may use the part of the downlink equivalent channel as the to-be-indicated information. For another example, the first terminal device may use the part of the downlink equivalent channel on which processing (for example, normalization processing) has been performed as the to-be-indicated information.

Alternatively, the first terminal device may determine the to-be-indicated information based on an equivalent channel obtained by combining equivalent channels of reference signals sent for a plurality of times. For example, the first terminal device may use the equivalent channel obtained through combination as the to-be-indicated information. For another example, the first terminal device may use the equivalent channel that is obtained through combination and on which processing (for example, normalization processing) has been performed as the to-be-indicated information.

Alternatively, the first terminal device may determine the to-be-indicated information based on an equivalent channel obtained by combining equivalent channels of reference signals sent on a plurality of transmission resources, where the plurality of transmission resources include the first transmission resource. For example, the first terminal device may use the equivalent channel obtained through combination as the to-be-indicated information. For another example, the first terminal device may use the equivalent channel that is obtained through combination and on which processing (for example, normalization processing) has been performed as the to-be-indicated information.

In this embodiment of this disclosure, a frequency-domain granularity of the to-be-indicated information corresponding to the first terminal device is related to a resource size of the first transmission resource. For example, if the granularity of the first transmission resource is that one sub-band is included in frequency domain, to be specific, one downlink reference signal is sent on each sub-band, the to-be-indicated information is at a sub-band granularity. For another example, if the granularity of the first transmission resource is two RBs, to be specific, one downlink reference signal is sent on every two RBs, the to-be-indicated information is at a granularity of two RBs.

In this embodiment of this disclosure, the downlink equivalent channel is obtained by performing channel estimation based on the downlink reference signal. The downlink equivalent channel can be used to determine the to-be-indicated information corresponding to the terminal device, so that the terminal device may obtain, based on the downlink equivalent channel, content to be (directly or indirectly) indicated by the network device to the terminal device. That the to-be-indicated information is an uplink precoding matrix is used as an example. In comparison with the codebook based UL transmission manner and the non-codebook based UL transmission manner, according to the method provided in this embodiment of this disclosure, it is unnecessary to occupy an additional resource to indicate the uplink precoding matrix, and there is no limitation on resource overheads. Therefore, the uplink precoding matrix can be indicated more precisely, and uplink transmission spectral efficiency can be improved. In addition, according to the method provided in this embodiment of this disclosure, the frequency-domain granularity of the to-be-indicated information is related to the resource size of the transmission resource on which the downlink reference signal is carried. Therefore, indication at different granularities may be implemented by adjusting the resource size of the first transmission resource. In this way, indication flexibility and precision can be improved.

To help understand the solution, the following describes the solution provided in this embodiment of this disclosure by using an example in which the downlink precoding matrix is determined based on the downlink channel response and the to-be-indicated information corresponding to the terminal device, and the to-be-indicated information is an uplink precoding matrix used when the first terminal device sends uplink data on one transmission resource.

In an implementation, that a network device generates a downlink reference signal may be specifically implemented in the following manners:

A1. The network device determines a downlink channel response of the first terminal device.

In an implementation, the first terminal device may send an uplink reference signal to the network device. The network device may estimate an uplink channel response based on the uplink reference signal, and determine the downlink channel response based on channel reciprocity.

In another implementation, the network device may alternatively send the downlink reference signal to the first terminal device. The first terminal device estimates the downlink channel response based on the downlink reference signal, and feeds back the downlink channel response to the network device.

Alternatively, the network device may determine the downlink channel response in another manner. This is not specifically limited herein.

A2. The network device determines, based on the uplink precoding matrix corresponding to the first terminal device, and the downlink channel response, the downlink precoding matrix used when the first terminal device sends the downlink reference signal.

For example, in an SU scenario, the network device may determine, based on an uplink channel response of the first terminal device, the uplink precoding matrix corresponding to the first terminal device.

In an MU scenario, the network device may determine, based on uplink channel responses of a plurality of terminal devices including the first terminal device, the uplink precoding matrix corresponding to the first terminal device. For example, the network device receives uplink reference signals sent by the plurality of terminal devices including the first terminal device, and determines, based on the uplink reference signals sent by the plurality of terminal devices, the to-be-indicated information corresponding to the first terminal device.

In an implementation, the network device may determine the downlink precoding matrix by using a formula, or it may be understood as that the downlink precoding matrix satisfies the following formula:

$$H\_DL*P\_DL=P\_UL, \text{ where}$$

H_DL is the downlink channel response, P_DL is the downlink precoding matrix, and P_UL is the uplink precoding matrix. It should be understood that P_UL may be an uplink precoding matrix determined by the network device, or may be obtained by performing adaptive processing (for example, normalization processing) on the determined uplink precoding matrix by the network device.

In some embodiments, if the network device indicates, to a plurality of terminal devices, uplink precoding matrices respectively corresponding to the plurality of terminal devices, and each terminal device sends, through a group of antenna ports, a downlink reference signal to indicate information, many resources may be used. In a possible implementation, the network device may simultaneously indicate to the plurality of terminal devices, and may reuse a same antenna port to send downlink reference signals. In other words, the network device sends the downlink reference signals through the same antenna port. Downlink equivalent channels obtained by different terminal devices based on the downlink reference signals received by the different terminal devices are uplink precoding matrices corresponding to the different terminal devices.

For example, the network device uses a same antenna port to simultaneously send downlink reference signals to K terminal devices, to indicate respective uplink precoding matrices to the K terminal devices. A downlink precoding matrix for sending the downlink reference signals may be determined based on a first matrix and a second matrix, where the first matrix includes downlink channel responses of the K terminal devices, and the second matrix includes to-be-indicated information respectively corresponding to the K terminal devices. In this way, a downlink equivalent channel obtained by each terminal device based on the received downlink reference signal is the uplink precoding matrix corresponding to the terminal device.

Figure 8:
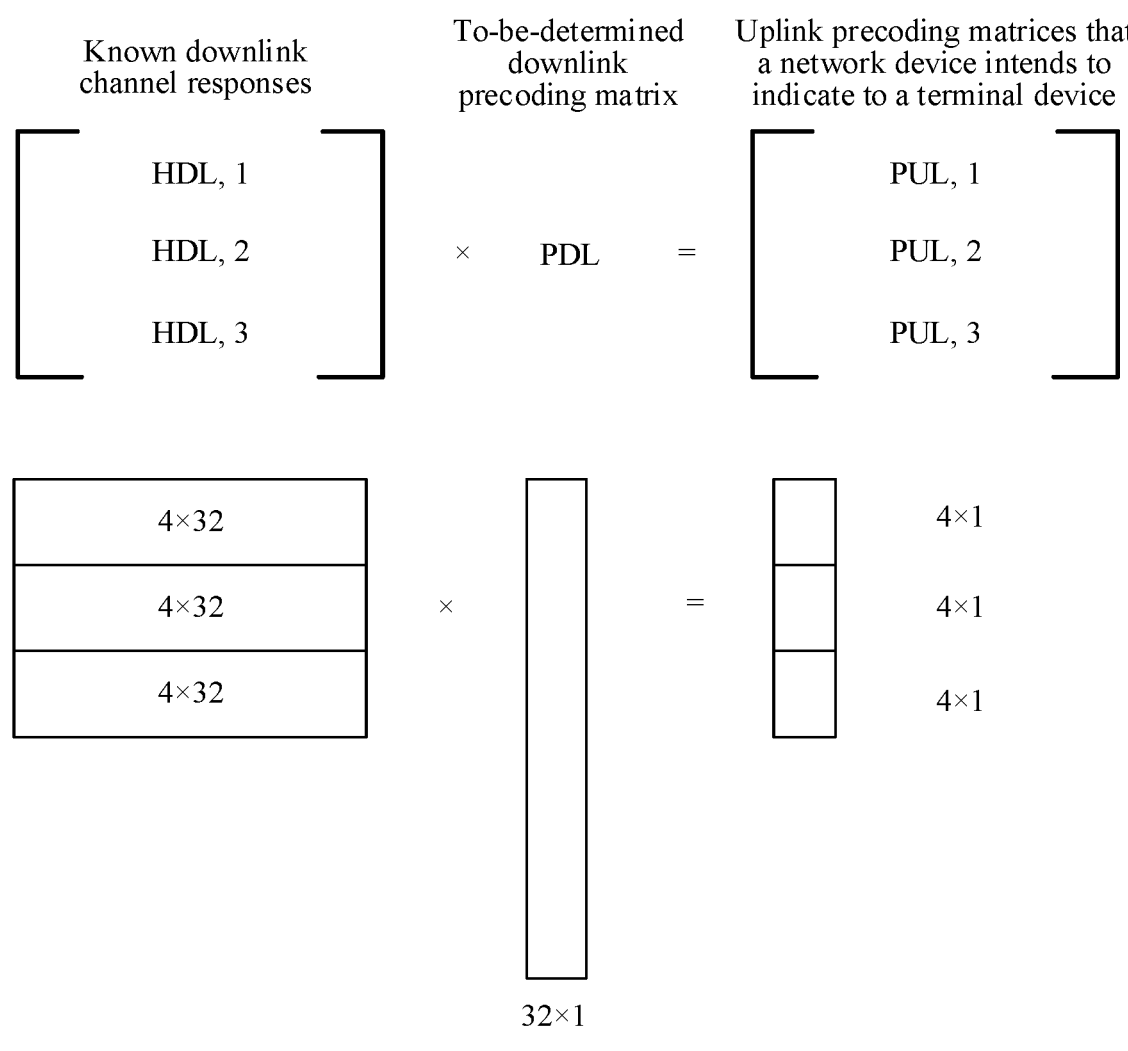
FIG. 8 is a schematic diagram of determining a downlink precoding matrix according to an embodiment of this disclosure.

For example, as shown in FIG. 8, a network device simultaneously indicates, to three terminal devices, uplink precoding matrices of the three terminal devices through a same antenna port.

A3. The network device processes the downlink reference signal based on the downlink precoding matrix.

In some embodiments, the network device may further send DCI to the first terminal device, where the DCI indicates N antenna ports on which the network device sends the downlink reference signal, and an uplink transmission rank. The DCI is associated with the N antenna ports, the downlink reference signal sent on the N antenna ports is for determining the uplink precoding matrix, and N is an integer greater than 0. For example, N may be a maximum quantity of layers for performing uplink transmission by the first terminal device. In this way, when sending the DCI, the network device may send the downlink reference signal to the first terminal device on the first transmission resource through the N antenna ports.

In an example description, that the DCI is associated with the N antenna ports may be implemented in the following manner: The DCI may indicate an identifier (identifier, ID) for downlink reference signal measurement, for example, an ID for CSI measurement.

In another example description, that the DCI is associated with the N antenna ports may be implemented in the following manner: An association relationship between the DCI and the antenna ports may be specified in a protocol.

Optionally, a location of a transmission resource on which the downlink reference signal is carried may be further specified in the protocol. For example, that the downlink reference signal is measured at a specified time-frequency resource location of a time-frequency resource that the DCI is on may be specified in the protocol. For example, that the downlink reference signal is measured on an RE corresponding to a symbol of the time-frequency resource that the DCI is on may be specified in the protocol.

In this embodiment of this disclosure, the downlink reference signal may be sent aperiodically, for example, sent through triggering by DCI.

Optionally, after the first terminal device receives the DCI and the downlink reference signal, when performing channel estimation based on the downlink reference signal, to obtain a downlink equivalent channel corresponding to the first transmission resource, the first terminal device may perform channel estimation on the downlink reference signal that is from first n antenna ports of the N antenna ports and that is carried on the first transmission resource, where n is the uplink transmission rank.

Optionally, the first terminal device may receive, through M antennas, the downlink reference signal carried on the first transmission resource, and perform channel estimation on the downlink reference signal that is received through a first antenna of the M antennas and that is carried on the first transmission resource, where the first antenna is an antenna that is of the M antennas and that is for uplink sending. For example, the first terminal device is a terminal device of 2T4R, a1 and a2 of the first terminal device may be used as transmit antennas or receive antennas, and a3 and a4 are used as receive antennas. The first terminal device may receive downlink reference signals through a1 to a4, and perform channel estimation on downlink reference signals received through a1 and a2. In the foregoing manner, it can be ensured that a send port and a receive port on a terminal side match each other, so that accuracy of the uplink precoding matrix can be improved.

In an implementation, after receiving the DCI and the downlink reference signal, the first terminal device may perform channel estimation on the downlink reference signal that is received through the first antenna of the M antennas and that is from the first n antenna ports of the N antenna ports, to obtain the downlink equivalent channel.

The following describes the solution provided in this embodiment of this disclosure by using a specific example.

Figure 9:
FIG. 9 is a schematic flowchart of indicating an uplink precoding matrix according to an embodiment of this disclosure.

As shown in FIG. 9, a terminal device of 2T4R is used as an example. A process in which a network device indicates an uplink precoding matrix of one RB to the terminal device is as follows:

S901. UE 1 sends an SRS to the network device.

S902. The network device estimates an uplink channel response H_UL based on the SRS.

S903. The network device determines a downlink channel response H_DL based on channel reciprocity.

S904. The network device determines an uplink precoding matrix P_UL of the UE 1 based on uplink channel responses of a plurality of UEs including the UE 1.

S905. The network device determines a downlink precoding matrix P_DL based on P_UL and H_DL.

Figure 10:
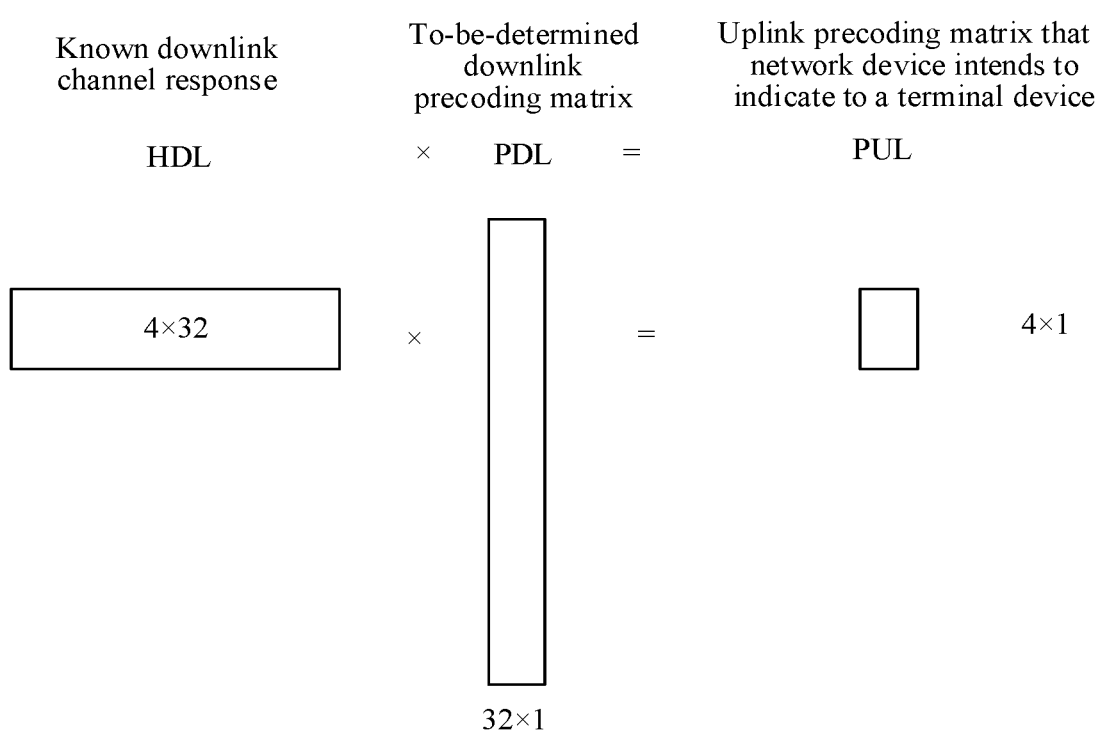
FIG. 10 is a schematic diagram of determining a downlink precoding matrix according to an embodiment of this disclosure.

P_UL, H_DL, and P-DL satisfy the following formula: H_DL*P_DL=P_UL, as shown in FIG. 10.

S906. The network device sends DCI to the UE 1, and sends a CSI-RS on one RE of the RB through N CSI-RS ports associated with the DCI, where the CSI-RS is obtained by processing P_DL, and the DCI indicates an uplink transmission rank. Correspondingly, the UE 1 receives the DCI and the CSI-RS through four receive antennas.

S907. The UE 1 performs channel estimation based on the CSI-RS that is received through two transmit antennas and that is from first n CSI-RS ports of the N CSI-RS ports, to obtain a downlink equivalent channel.

S908. The UE 1 determines, based on the downlink equivalent channel, the uplink precoding matrix for performing uplink transmission on the RB.

For example, if a quantity of CSI-RS ports configured by the network device is 4, and the uplink transmission rank indicated in the DCI is 3, downlink equivalent channels of first three CSI-RS ports are respectively uplink precoding matrices of three uplink streams.

Optionally, the UE 1 may perform normalization processing on the downlink equivalent channel, to be specific, normalize a vector magnitude of 4*1 to 1, and use the normalized downlink equivalent channel as the uplink precoding matrix for performing uplink transmission by the terminal device on the RB.

S909. The UE 1 sends uplink data on the RB by using the uplink precoding matrix.

In some embodiments, if uplink precoding matrices indicated by the network device to UE are a plurality of streams, each stream may be indicated in the manner provided in this embodiment of this disclosure. For example, uplink precoding matrices of two uplink streams may be respectively indicated by using two CSI-RS ports.

In an example description, the DCI may include a field for indicating the uplink transmission rank. Alternatively, if the uplink transmission rank and other information (for example, the uplink precoding matrix) are jointly indicated in the DCI, it may be considered that only indication of the uplink transmission rank is valid in the DCI.

Figure 11:
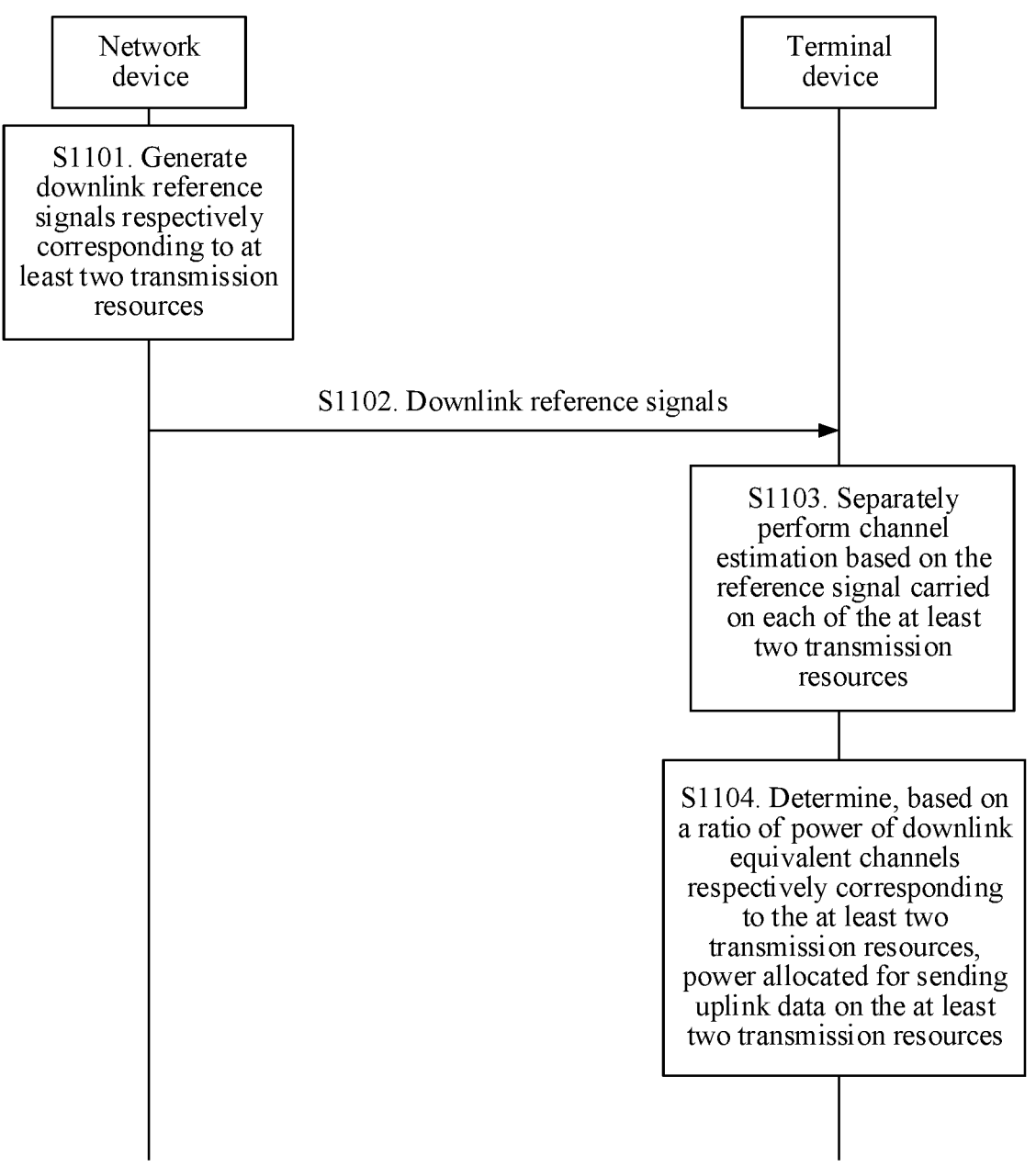
FIG. 11 is a schematic flowchart of a method for indicating a ratio of power according to an embodiment of this disclosure.

FIG. 11 shows another information obtaining method according to an embodiment of this disclosure. The method may be applied to the communication system shown in FIG. 1. For ease of understanding, this embodiment is described from perspectives of a terminal device side and a network device side. It should be understood that this does not constitute a limitation on this disclosure. In this disclosure, there are improvements on either of the terminal device side and the network device side. Specifically, the method may be applied to a terminal device and a network device, or may be applied to chips or chip sets/chip systems in the terminal device and the network device. The following uses an example in which the method is applied to the terminal device and the network device for description. The information obtaining method may specifically include the following steps.

S1101. The network device generates downlink reference signals respectively corresponding to at least two transmission resources.

For example, a granularity of one transmission resource may be: One sub-band is included in frequency domain, or a plurality of sub-bands are included in frequency domain. Alternatively, a granularity of one transmission resource may be one RB, or may be a plurality of RBs. Alternatively, one transmission resource may be at another granularity. This is not listed one by one herein.

For example, the downlink reference signal corresponding to each of the transmission resources may be obtained by processing a downlink precoding matrix corresponding to each of the transmission resources; and the downlink precoding matrices corresponding to the at least two transmission resources are determined based on downlink channel responses respectively corresponding to the at least two transmission resources and a ratio of power of the at least two transmission resources, where the downlink channel responses corresponding to the transmission resources are channel responses for receiving the downlink signals by the terminal device on the transmission resources, and the ratio of the power is a ratio of transmit power at which the terminal device respectively sends uplink signals on the at least two transmission resources.

The ratio of the power of the at least two transmission resources is content that the network device intends to indicate to the terminal device.

S1102. The network device respectively sends the corresponding downlink reference signals to the terminal device on the at least two transmission resources, where the downlink reference signals carried on the at least two transmission resources are used by the terminal device to determine power allocated for sending uplink data by the terminal device on the at least two transmission resources. Correspondingly, the terminal device receives the downlink reference signals respectively sent by the network device on the at least two transmission resources. It may be understood that a downlink reference signal sent on one transmission resource may be used as one downlink reference signal, and downlink reference signals carried on different transmission resources may be considered as different downlink reference signals.

It may be understood that, to send a downlink reference signal on a transmission resource, the downlink reference signal may be carried on a part of the transmission resource for sending. For example, assuming that the transmission resource includes one RB, the network device may send the downlink reference signal on one RE of the RB.

In an example description, the network device may separately send a downlink reference signal on one RE of each of three RBs, to indicate a ratio of transmit power at which the terminal device sends uplink data on the three RBs.

S1103. The terminal device separately performs channel estimation based on a reference signal carried on each of the at least two transmission resources, to obtain downlink equivalent channels respectively corresponding to the at least two transmission resources.

S1104. The terminal device determines, based on a ratio of power of the downlink equivalent channels respectively corresponding to the at least two transmission resources, the power allocated for sending the uplink data on the at least two transmission resources.

For example, the terminal device determines that transmit power at which the uplink data is sent on a first transmission resource may satisfy the following formula, or it may be understood as that the terminal device determines the transmit power at which the uplink data is sent on the first transmission resource through the following formula, where the first transmission resource is any resource in the at least two transmission resources:

$$\frac{p}{P} = \frac{\|P^n_{UL}\|^2}{\sum_{1}^{K} \|P^n_{UL}\|^2},$$

where p is the transmit power at which the uplink data is sent on the first transmission resource, P is total power of an uplink transmission layer of the terminal device, $$P^n_{UL}$$

is a downlink equivalent channel corresponding to the first transmission resource, K is a quantity of transmission resources included in the at least two transmission resources, and $$P^k_{UL}$$

is a downlink equivalent channel corresponding to a $k^{th}$ transmission resource in the at least two transmission resources.

Optionally, the terminal device may obtain the total power of the uplink transmission layer in another manner, for example, in an indication manner in a conventional technology. Details are not described herein again.

In the manner provided in this embodiment of this disclosure, power allocated between transmission resources may be indicated. For example, assuming that one transmission resource includes one sub-band in frequency domain, power allocated between sub-bands may be indicated in the foregoing manner. In this way, the terminal device may determine, based on a ratio of power at which downlink equivalent channels are received on the sub-bands, the power allocated between the sub-bands.

In another example, assuming that one transmission resource includes one RB in frequency domain, power allocated between RBs may be indicated in the foregoing manner. In this way, the terminal device may determine, based on a ratio of power at which the downlink equivalent channels are received on the RBs, the power allocated between the RBs.

Figure 12:
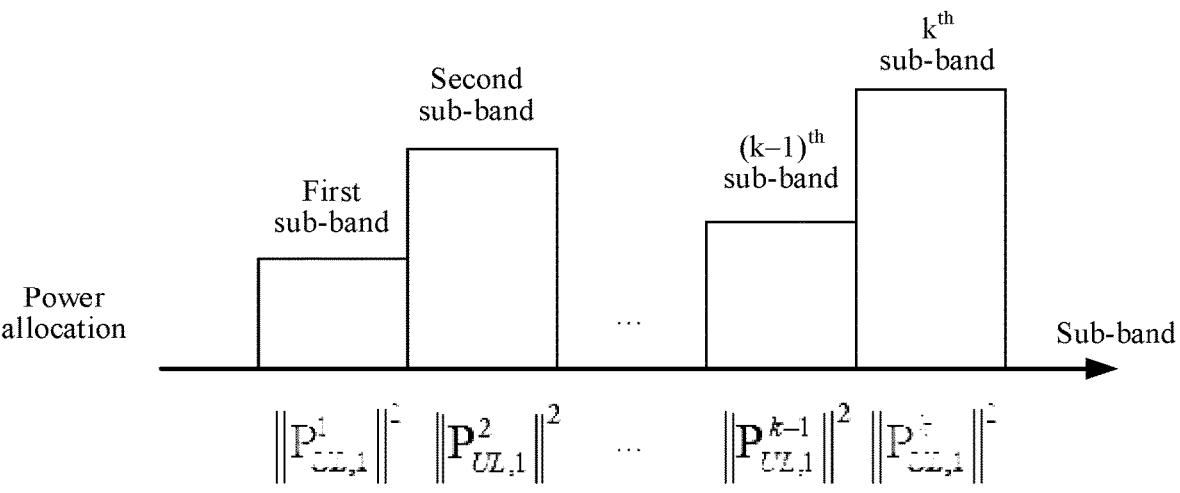
FIG. 12 is a schematic flowchart of indicating a ratio of power between sub-bands according to an embodiment of this disclosure.

For example, that a transmission resource includes one sub-band in the frequency domain is used as example. Power allocated between sub-bands may be shown in FIG. 12.

Figure 13:
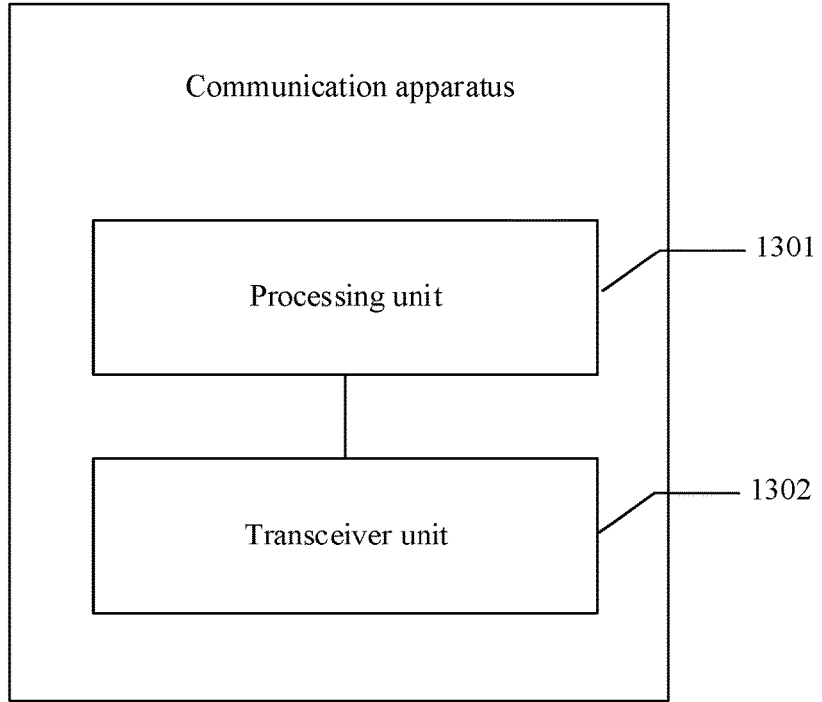
FIG. 13 is a schematic diagram of a structure of a communication apparatus according to an embodiment of this disclosure.

Based on a same technical concept as the method embodiments, an embodiment of this disclosure provides a communication apparatus. A structure of the communication apparatus may be as shown in FIG. 13, and the apparatus includes a processing unit 1301 and a transceiver unit 1302.

In an implementation, the communication apparatus may be specifically configured to implement the method performed by the first terminal device in the embodiment in FIG. 7. The apparatus may be the first terminal device, or may be a chip or a chip set/chip system in the first terminal device, or a part that is of a chip and that is configured to perform a related method function. The transceiver unit 1302 is configured to receive a downlink reference signal sent by a network device on a first transmission resource. The processing unit 1301 is configured to: perform channel estimation based on the downlink reference signal, to obtain a downlink equivalent channel corresponding to the first transmission resource; and determine, based on the downlink equivalent channel, to-be-indicated information corresponding to a terminal device, where the to-be-indicated information indicates an uplink precoding matrix used when the terminal device sends uplink data on the first transmission resource.

For example, the downlink reference signal is obtained by processing a downlink precoding matrix, and the downlink precoding matrix is determined based on a downlink channel response and the to-be-indicated information corresponding to the terminal device.

Optionally, when determining, based on the downlink equivalent channel, the to-be-indicated information corresponding to the terminal device, the processing unit 1301 is specifically configured to use the downlink equivalent channel on which normalization processing has been performed as the to-be-indicated information corresponding to the terminal device.

The transceiver unit 1302 may be further configured to receive downlink control information DCI from the network device, where the DCI indicates N antenna ports on which the network device sends the downlink reference signal and an uplink transmission rank, the DCI is associated with the N antenna ports, and N is an integer greater than 0.

When performing channel estimation based on the downlink reference signal, the processing unit 1301 may be specifically configured to perform channel estimation on the downlink reference signal that is from first n antenna ports of the N antenna ports and that is carried on the first transmission resource, where n is the uplink transmission rank.

For example, the downlink reference signal sent on the N antenna ports is for determining the uplink precoding matrix.

Optionally, when receiving the downlink reference signal sent by the network device on the first transmission resource, the transceiver unit 1302 is specifically configured to receive, through M antennas, the downlink reference signal carried on the first transmission resource.

When performing channel estimation based on the downlink reference signal, the processing unit 1301 may be specifically configured to perform channel estimation on the downlink reference signal that is received through a first antenna of the M antennas and that is carried on the first transmission resource, where the first antenna is an antenna that is of the M antennas and that is for uplink sending.

Optionally, the transceiver unit 1302 is further configured to send an uplink reference signal to the network device before receiving the downlink reference signal sent by the network device on the first transmission resource.

For example, a frequency-domain granularity of the to-be-indicated information corresponding to the terminal device is related to a resource size of the first transmission resource.

In an implementation, the communication apparatus may be specifically configured to implement the method performed by the network device in the embodiment in FIG. 7.

The apparatus may be the network device, or may be a chip or a chip set/chip system in the network device, or a part that is of a chip and that is configured to perform a related method function. The processing unit 1301 is configured to generate a downlink reference signal. The transceiver unit 1302 is configured to send the downlink reference signal to a first terminal device on a first transmission resource, where the downlink reference signal is used by the first terminal device to determine to-be-indicated information corresponding to the first terminal device, and the to-be-indicated information indicates an uplink precoding matrix used when the first terminal device sends uplink data on the first transmission resource.

For example, the downlink reference signal is obtained by processing a downlink precoding matrix, and the downlink precoding matrix is determined based on a downlink channel response and the to-be-indicated information corresponding to the first terminal device.

For example, if a network device uses a same antenna port to send downlink reference signals to K terminal devices on the first transmission resource, and the K terminal devices include the first terminal device, the downlink precoding matrix is determined based on a first matrix and a second matrix, where the first matrix includes downlink channel responses of the K terminal devices, and the second matrix includes to-be-indicated information respectively corresponding to the K terminal devices.

Optionally, the transceiver unit 1302 is further configured to send downlink control information DCI to the first terminal device, where the DCI indicates N antenna ports on which the network device sends the downlink reference signal, and an uplink transmission rank, the DCI is associated with the N antenna ports, and N is an integer greater than 0.

When sending the downlink reference signal to the first terminal device on the first transmission resource, the transceiver unit 1302 may be specifically configured to send the downlink reference signal to the first terminal device on the first transmission resource through the N antenna ports.

Optionally, the processing unit 1301 is further configured to: before generating the downlink reference signal, receive, by using the transceiver unit 1302, uplink reference signals sent by a plurality of terminal devices including the first terminal device; and determine, based on the uplink reference signals sent by the plurality of terminal devices, the to-be-indicated information corresponding to the first terminal device.

For example, a frequency-domain granularity of the to-be-indicated information corresponding to the first terminal device is related to a resource size of the first transmission resource.

In an implementation, the communication apparatus may be specifically configured to implement the method performed by the first terminal device in the embodiment in FIG. 11. The apparatus may be the first terminal device, or may be a chip or a chip set/chip system in the first terminal device, or a part that is of a chip and that is configured to perform a related method function. The transceiver unit 1302 is configured to receive downlink reference signals respectively sent by a network device on at least two transmission resources. The processing unit 1301 is configured to: separately perform channel estimation based on the reference signal carried on each of the at least two transmission resources, to obtain downlink equivalent channels respectively corresponding to the at least two transmission resources; and determine, based on a ratio of power of the downlink equivalent channels respectively corresponding to the at least two transmission resources, power allocated for sending uplink data on the at least two transmission resources.

For example, the downlink reference signal carried on each of the transmission resources is obtained by processing a downlink precoding matrix corresponding to each of the transmission resources; and the downlink precoding matrices corresponding to the at least two transmission resources are determined based on downlink channel responses respectively corresponding to the at least two transmission resources and a ratio of power of the at least two transmission resources, where the downlink channel responses corresponding to the transmission resources are channel responses for receiving the downlink signals by a terminal device on the transmission resources, and the ratio of the power is a ratio of transmit power at which the terminal device respectively sends uplink signals on the at least two transmission resources.

Optionally, when determining, based on the ratio of the power of the downlink equivalent channels corresponding to the at least two transmission resources, the power allocated for sending the uplink data on the at least two transmission resources, the processing unit 1301 is specifically configured to determine that transmit power at which the uplink data is sent on a first transmission resource satisfies the following formula, where the first transmission resource is any resource in the at least two transmission resources:

$$\frac{p}{P} = \frac{\|P_{UL}^{n}\|^{2}}{\sum_{1}^{K} \|P_{UL}^{n}\|^{2}},$$

where
  p is the transmit power at which the uplink data is sent on the first transmission resource, P is total power of an uplink transmission layer of the terminal device, $$P_{UL}^{n}$$

is a downlink equivalent channel corresponding to the first transmission resource, K is a quantity of transmission resources included in the at least two transmission resources, and $$P_{UL}^{k}$$

is a downlink equivalent channel corresponding to a $k^{th}$ transmission resource in the at least two transmission resources.

In an implementation, the communication apparatus may be specifically configured to implement the method performed by the network device in the embodiment in FIG. 7. The apparatus may be the network device, or may be a chip or a chip set/chip system in the network device, or a part that is of a chip and that is configured to perform a related method function. The processing unit 1301 is configured to generate downlink reference signals respectively corresponding to at least two transmission resources. The transceiver unit 1302 is configured to respectively send the corresponding downlink reference signals to a terminal device on the at least two transmission resources, where the downlink reference signals carried on the at least two transmission resources are used by the terminal device to determine power allocated for sending uplink data by the terminal device on the at least two transmission resources.

For example, the downlink reference signal corresponding to each of the transmission resources is obtained by processing a downlink precoding matrix corresponding to each of the transmission resources; and the downlink precoding matrices corresponding to the at least two transmission resources are determined based on downlink channel responses respectively corresponding to the at least two transmission resources and a ratio of power of the at least two transmission resources, where the downlink channel responses corresponding to the transmission resources are channel responses for receiving the downlink signals by the terminal device on the transmission resources, and the ratio of the power is a ratio of transmit power at which the terminal device respectively sends uplink signals on the at least two transmission resources.

In embodiments of this disclosure, division into the modules is an example, and is merely logical function division. There may be another division manner during actual implementation. In addition, functional modules in embodiments of this disclosure may be integrated into one processor, or each of the modules may exist alone physically, or two or more modules may be integrated into one module. The integrated module may be implemented in a form of hardware, or may be implemented in a form of a software function module, or by a combination of hardware and a software function module. It may be understood that for functions or implementations of the modules in embodiments of this disclosure, further refer to related descriptions in the method embodiments.

Figure 14:
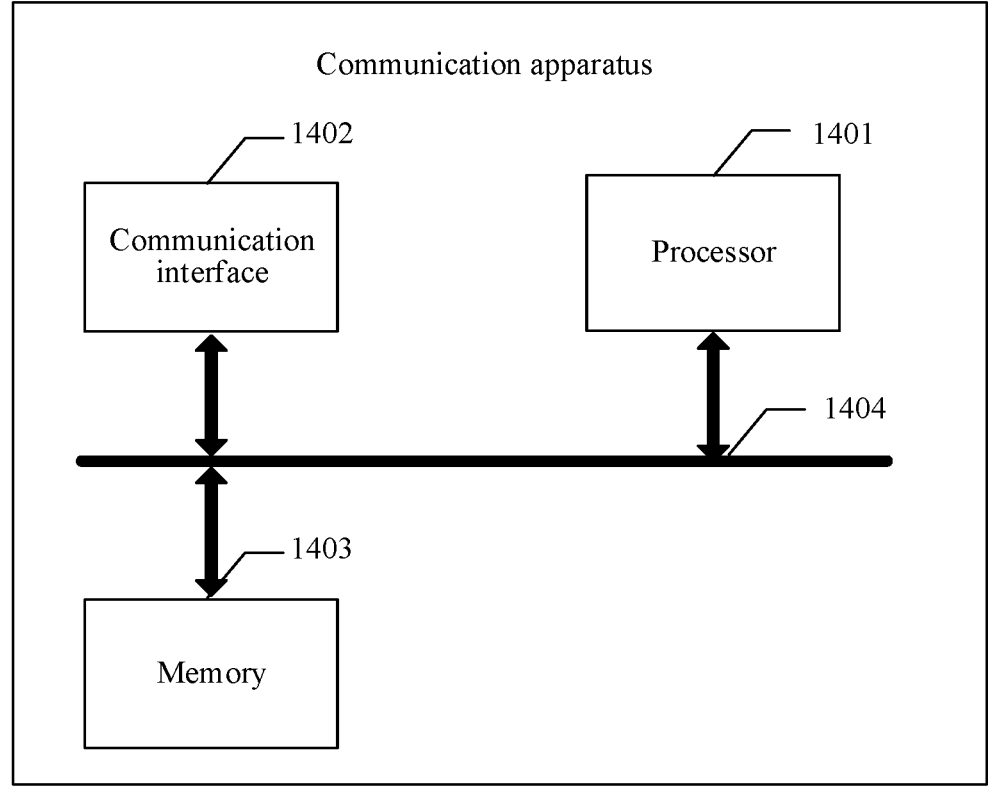
FIG. 14 is a schematic diagram of a structure of a communication apparatus according to an embodiment of this disclosure.

In a possible manner, the communication apparatus may be shown in FIG. 14. The communication apparatus may be a communication device or a chip in the communication device. The communication device may be an apparatus or a third apparatus. The apparatus may include a processor 1401. Optionally, the apparatus further includes a communication interface 1402, and optionally, the apparatus further includes a memory 1403. The processing unit 1301 may be the processor 1401. The transceiver unit 1302 may be the communication interface 1402.

The processor 1401 may be a central processing unit (central processing unit, CPU), a digital processing unit, a processing circuit, a logic circuit, or the like. The communication interface 1402 may be a transceiver, an interface circuit such as a transceiver circuit, or a transceiver chip. Alternatively, the communication interface 1402 may be an input and/or output pin, a circuit, or the like on a chip or a chip set/chip system. The apparatus further includes the memory 1403, configured to store a program executed by the processor 1401. The memory 1403 may be a nonvolatile memory, for example, a hard disk drive (hard disk drive, HDD) or a solid-state drive (solid-state drive, SSD), or may be a volatile memory (volatile memory), for example, a random-access memory (random-access memory, RAM). The memory 1403 is any other medium that can be used to carry or store expected program code in a form of instructions or a data structure and that can be accessed by a computer, but is not limited thereto.

The processor 1401 is configured to execute the program code stored in the memory 1403, and is specifically configured to perform an action of, for example, the processing unit 1301. Details are not described herein again in this disclosure. The communication interface 1402 is specifically configured to perform an action of, for example, the transceiver unit 1302. Details are not described herein again in this disclosure.

A specific connection medium between the communication interface 1402, the processor 1401, and the memory 1403 is not limited in this embodiment of this disclosure. In this embodiment of this disclosure, in FIG. 14, the memory 1403, the processor 1401, and the communication interface 1402 are connected through a bus 1404, and the bus is represented by using a bold line in FIG. 14. A connection manner between other parts is merely used as an example for description, and is not limited thereto. The bus may be classified into an address bus, a data bus, a control bus, and the like. For ease of representation, only one bold line is used to represent the bus in FIG. 14, but this does not mean that there is only one bus or only one type of bus.

An embodiment of the present invention further provides a computer-readable storage medium, configured to store computer software instructions that need to be executed for execution of the foregoing processor. The computer-readable storage medium includes a program that needs to be executed for execution of the foregoing processor.

An embodiment of the present invention further provides a computer program product, including a computer program that needs to be executed for execution of the foregoing processor.

A person skilled in the art should understand that embodiments of this disclosure may be provided as a method, a system, or a computer program product. Therefore, this disclosure may use a form of hardware only embodiments, software only embodiments, or embodiments with a combination of software and hardware. In addition, this disclosure may use a form of a computer program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the computer program product according to this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can guide the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this disclosure without departing from the protection scope of this disclosure. In this way, this disclosure is intended to cover these modifications and variations of this disclosure provided that they fall within the scope of the claims of this disclosure and their equivalent technologies.

What is claimed is:

1. An information obtaining method, comprising:

receiving, through M antennas, one or more downlink reference signals sent by a network device;

performing channel estimation based on a downlink reference signal of the one or more downlink reference signals, to obtain a downlink equivalent channel corresponding to a first transmission resource, wherein the downlink reference signal is received through a first antenna of the M antennas and carried on the first transmission resource, and the first antenna is for uplink sending; and determining, based on the downlink equivalent channel, to-be-indicated information corresponding to a terminal device, the to-be-indicated information indicating an uplink precoding matrix used when the terminal device sends uplink data on the first transmission resource.

2. The method according to claim 1, wherein the downlink reference signal is obtained by the network device based on a downlink precoding matrix associated with the to-be-indicated information corresponding to the terminal device.

3. The method according to claim 1, wherein determining, based on the downlink equivalent channel, the to-be-indicated information corresponding to the terminal device comprises:

using the downlink equivalent channel on which normalization processing has been performed as the to-be-indicated information corresponding to the terminal device.

4. The method according to claim 1, the method further comprising:

receiving downlink control information (DCI) from the network device, wherein the DCI indicates N antenna ports on which the network device sends the downlink reference signal, and an uplink transmission rank, the DCI being associated with the N antenna ports, and N being an integer greater than 0; and performing the channel estimation based on the downlink reference signal comprises:

performing channel estimation on the downlink reference signal that is from first n antenna ports of the N antenna ports and that is carried on the first transmission resource, wherein n is the uplink transmission rank.

5. The method according to claim 4, wherein the downlink reference signal sent on the N antenna ports is for determining the uplink precoding matrix.

6. An apparatus, comprising:

a processor, and one or more memories coupled to the processor and configured to store programming instructions that, when executed by the processor, cause the apparatus to perform operations comprising:

receiving, through M antennas, one or more downlink reference signals sent by a network device; and performing channel estimation, based on a downlink reference signal of the one or more downlink reference signals, to obtain a downlink equivalent channel corresponding to a first transmission resource, wherein the downlink reference signal is received through a first antenna of the M antennas and carried on the first transmission resource, and the first antenna is for uplink sending;

determining, based on the downlink equivalent channel, to-be-indicated information corresponding to a terminal device, the to-be-indicated information indicating an uplink precoding matrix used when the terminal device sends uplink data on the first transmission resource.

7. The apparatus according to claim 6, wherein the downlink reference signal is obtained by the network device based on a downlink precoding matrix associated with the to-be-indicated information corresponding to the terminal device.

8. The apparatus according to claim 6, wherein when determining, based on the downlink equivalent channel, the to-be-indicated information corresponding to the terminal device, the operations comprise:

using the downlink equivalent channel on which normalization processing has been performed as the to-be-indicated information corresponding to the terminal device.

9. The apparatus according to claim 6, wherein the operations further comprise:

receiving downlink control information (DCI) from the network device, wherein the DCI indicates N antenna ports on which the network device sends the downlink reference signal, and an uplink transmission rank, the DCI being associated with the N antenna ports, and N being an integer greater than 0; and when performing channel estimation based on the downlink reference signal, the operations comprise:

performing channel estimation on the downlink reference signal that is from first n antenna ports of the N antenna ports and that is carried on the first transmission resource, wherein n is the uplink transmission rank.

10. The apparatus according to claim 9, wherein the downlink reference signal sent on the N antenna ports is for determining the uplink precoding matrix.

11. The apparatus according to claim 6, wherein the apparatus is the terminal device; or the apparatus is a chip or chip system.

12. An apparatus, comprising:

a processor, and one or more memories coupled to the processor and configured to store programming instructions that, when executed by the processor, cause the apparatus to perform operations comprising:

receiving uplink reference signals sent by a plurality of terminal devices comprising a first terminal device;

determining, based on the uplink reference signals sent by the plurality of terminal devices, to-be-indicated information corresponding to the first terminal device;

generating a downlink reference signal based on the to-be-indicated information, the to-be-indicated information indicating an uplink precoding matrix of a first terminal device; and sending the downlink reference signal to the first terminal device on a first transmission resource.

13. The apparatus according to claim 12, wherein generating the downlink reference signal based on the to-be-indicated information comprises:

determining a downlink precoding matrix based on the to-be-indicated information corresponding to the first terminal device;

generating the downlink reference signal in accordance with the downlink precoding matrix.

14. The apparatus according to claim 13, wherein if a network device uses a same antenna port to send downlink reference signals to K terminal devices on the first transmission resource, and the K terminal devices comprise the first terminal device, the operations comprise:

obtaining downlink channel responses of the K terminal devices and to-be-indicated information corresponding to the respective K terminal devices;

determining the downlink precoding matrix based on a first matrix and a second matrix, wherein the first matrix comprises the downlink channel responses of the K terminal devices, and the second matrix comprises the to-be-indicated information corresponding to the respective K terminal devices.

15. The apparatus according to claim 12, wherein the operations further comprise:

sending downlink control information (DCI) to the first terminal device, wherein the DCI indicates N antenna ports on which the network device sends the downlink reference signal, and an uplink transmission rank, the DCI being associated with the N antenna ports, and N being an integer greater than 0; and when sending the downlink reference signal to the first terminal device on the first transmission resource, the operations comprise:

sending the downlink reference signal to the first terminal device on the first transmission resource through the N antenna ports.

16. The apparatus according to claim 12, wherein a frequency-domain granularity of the to-be-indicated information corresponding to the first terminal device is related to a resource size of the first transmission resource.

17. The apparatus according to claim 12, wherein the apparatus is the network device; or the apparatus is a chip or chip system.

\* \* \* \* \*